(12) United States Patent
Koyauchi et al.

(10) Patent No.: US 11,792,340 B2
(45) Date of Patent: Oct. 17, 2023

(54) PRINTING DEVICE WITH USER INTERFACE

(71) Applicant: SEIKO EPSON CORPORATION, Tokyo (JP)

(72) Inventors: Yasuo Koyauchi, Nagano (JP); Seiji Kimura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/810,853

(22) Filed: Jul. 6, 2022

(65) Prior Publication Data

US 2023/0010458 A1 Jan. 12, 2023

(30) Foreign Application Priority Data

Jul. 8, 2021 (JP) ................................. 2021-113509

(51) Int. Cl.
| | |
|---|---|
| *G06F 3/12* | (2006.01) |
| *H04N 1/00* | (2006.01) |
| *G06F 3/044* | (2006.01) |
| *G09B 21/00* | (2006.01) |
| *B41J 29/38* | (2006.01) |

(52) U.S. Cl.
CPC .......... *H04N 1/00493* (2013.01); *B41J 29/38* (2013.01); *G06F 3/044* (2013.01); *G09B 21/003* (2013.01); *H04N 1/00384* (2013.01); *H04N 1/00411* (2013.01); *H04N 1/00496* (2013.01); *H04N 1/00888* (2013.01)

(58) Field of Classification Search
CPC .......... H04N 1/00493; H04N 1/00384; H04N 1/00411; H04N 1/00496; H04N 1/00888; B41J 29/393; G06F 3/044; G09B 21/003
See application file for complete search history.

(56) References Cited

U.S. PATENT DOCUMENTS

| | | |
|---|---|---|
| 2002/0054252 A1 | 5/2002 | Ishii et al. |
| 2003/0113639 A1 | 6/2003 | Kawase |
| 2005/0084777 A1 | 4/2005 | Kawase |
| 2006/0031238 A1 | 2/2006 | Baba |
| 2011/0187782 A1 | 8/2011 | Miyazawa |
| 2011/0199638 A1 | 8/2011 | Ogino et al. |
| 2012/0243042 A1 | 9/2012 | Uchida |

(Continued)

FOREIGN PATENT DOCUMENTS

| | | |
|---|---|---|
| JP | S63-124657 A | 5/1988 |
| JP | 2002-098948 A | 4/2002 |

(Continued)

*Primary Examiner* — Moustapha Diaby
(74) *Attorney, Agent, or Firm* — Global IP Counselors, LLP

(57) ABSTRACT

Provided is a printing device that performs printing using a recording material, the printing device including: an capacitive touch panel; a home operation portion including a mechanical key for transitioning from a screen displayed on the capacitive touch panel to a basic screen including information on a remaining amount of the recording material; and a power supply operation portion including a mechanical key for shifting a power state of the printing device, in which a panel installation surface provided with the capacitive touch panel is a surface different from a power supply operation portion installation surface provided with the power supply operation portion.

17 Claims, 12 Drawing Sheets

(56) References Cited

U.S. PATENT DOCUMENTS

| | | | |
|---|---|---|---|
| 2012/0319939 A1* | 12/2012 | Kawashima | G06F 3/0482 345/156 |
| 2013/0063780 A1 | 3/2013 | Dullaert et al. | |
| 2014/0078536 A1 | 3/2014 | Hamamoto et al. | |
| 2015/0116769 A1 | 4/2015 | Nakagawa et al. | |
| 2015/0222766 A1 | 8/2015 | Ogino et al. | |
| 2017/0028747 A1 | 2/2017 | Kanda | |
| 2017/0034371 A1 | 2/2017 | Ogino et al. | |
| 2017/0068447 A1 | 3/2017 | Hong et al. | |
| 2017/0111526 A1* | 4/2017 | Nakamura | H04N 1/00551 |
| 2017/0359473 A1 | 12/2017 | Ogino et al. | |
| 2018/0097971 A1 | 4/2018 | Suzuki | |
| 2018/0278764 A1 | 9/2018 | Ogino et al. | |
| 2019/0094977 A1 | 3/2019 | Ishihara | |
| 2019/0193411 A1* | 6/2019 | Minamikawa | B41J 2/17513 |
| 2019/0215409 A1 | 7/2019 | Ogino et al. | |
| 2022/0009241 A1 | 1/2022 | Azechi et al. | |

FOREIGN PATENT DOCUMENTS

| | | |
|---|---|---|
| JP | 2003-145896 A | 5/2003 |
| JP | 2003-185824 A | 7/2003 |
| JP | 2005-231198 A | 9/2005 |
| JP | 2008-134771 A | 6/2008 |
| JP | 2010-134356 A | 6/2010 |
| JP | 2011-170070 A | 9/2011 |
| JP | 2013-003927 A | 1/2013 |
| JP | 2013-158956 A | 8/2013 |
| JP | 2014-059629 A | 4/2014 |
| JP | 2015-087931 A | 5/2015 |
| JP | 2017-030249 A | 2/2017 |
| JP | 2018-058228 A | 4/2018 |
| JP | 2018-120329 A | 8/2018 |
| JP | 2019-150982 A | 9/2019 |
| WO | 2010/084606 A1 | 7/2010 |

* cited by examiner

PRINTING DEVICE WITH USER INTERFACE

The present application is based on, and claims priority from JP Application Serial Number 2021-113509, filed Jul. 8, 2021, the disclosure of which is hereby incorporated by reference herein in its entirety.

BACKGROUND

1. Technical Field

The present disclosure relates to a printing device.

2. Related Art

In the related art, a user interface in which various inputs are performed through an operation portion such as a button is known. For example, JP-A-2018-120329 discloses a technique for adjusting the visibility of an operation portion by causing the operation portion to emit light or not.

When there is no consideration for a positional relationship between components of the user interface, there is a problem that an operability deteriorates.

SUMMARY

According to an aspect of the present disclosure, there is provided a printing device that performs printing using a recording material, the printing device including: an capacitive touch panel; a home operation portion including a mechanical key for transitioning from a screen displayed on the capacitive touch panel to a basic screen including information on a remaining amount of the recording material; and a power supply operation portion including a mechanical key for shifting a power state of the printing device, in which a panel installation surface provided with the capacitive touch panel is a surface different from a power supply operation portion installation surface provided with the power supply operation portion.

DESCRIPTION OF EXEMPLARY EMBODIMENTS

Here, embodiments of the present disclosure will be described in the following order.
1. Configuration of printing device
2. Disposition for improving operability
3. Other embodiments

1. Configuration of Printing Device

Figure 1:
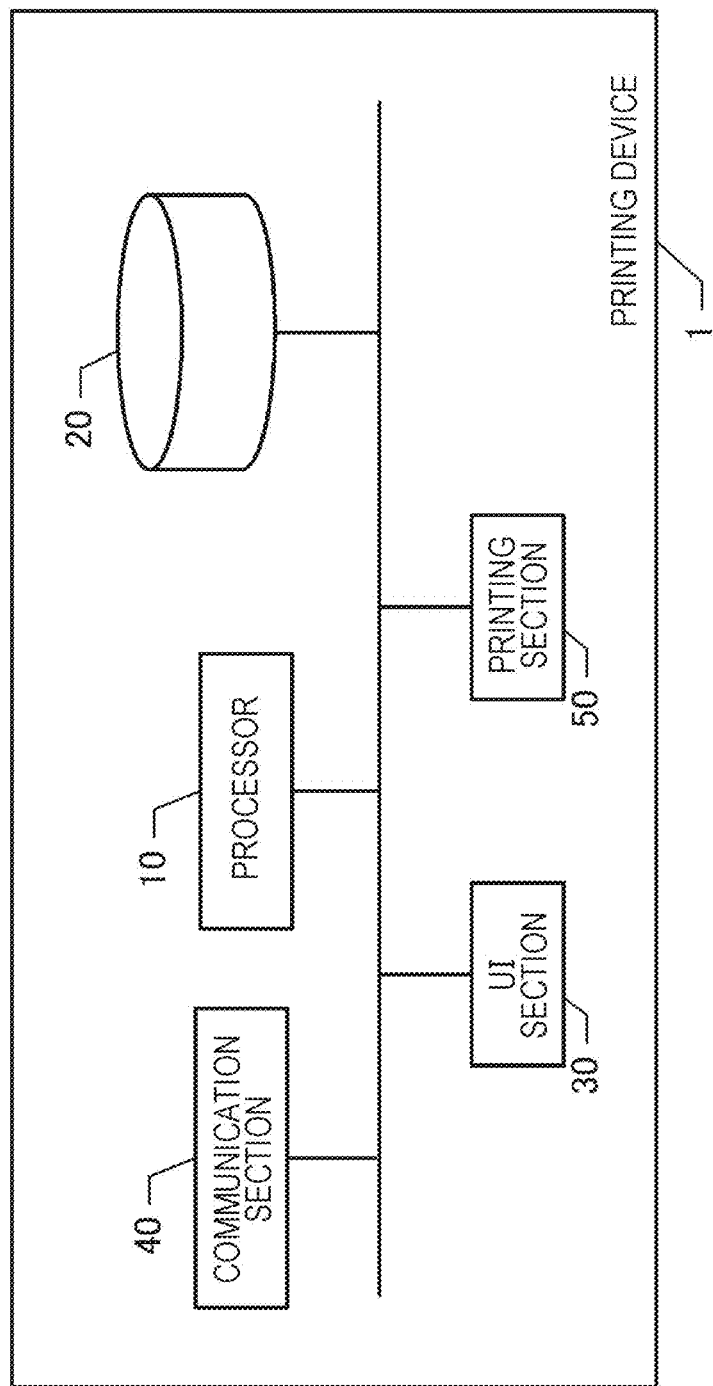
FIG. 1 is a block diagram showing a configuration of a printing device.

FIG. 1 is a block diagram showing a configuration of a printing device 1 according to an embodiment of the present disclosure. The printing device 1 includes a processor 10, a non-volatile memory 20, a user interface (UI) section 30, a communication section 40, and a printing section 50. The processor 10 includes a CPU, ROM, RAM, and the like (not shown), and can execute various programs recorded in the non-volatile memory 20 to control each section of the printing device 1. The processor 10 may be composed of a single chip or a plurality of chips, or may be configured as an SoC together with various functional blocks for operating a printing device. Further, for example, an ASIC may be employed instead of the CPU, or the CPU and the ASIC may cooperate with each other.

The non-volatile memory 20 records programs (not shown) executed by the processor 10, setting data, image data, and the like. The setting data is data indicating settings when performing various processes in the printing device 1. The image data is data for displaying a screen as a user interface on the UI section 30 and the like.

The UI section 30 is a device that receives an input of a user and outputs various information to the user. In the present embodiment, the UI section 30 has an capacitive touch panel and an operation portion including mechanical keys. The capacitive touch panel includes a display panel for displaying various information and an electrostatic touch operation detection portion superimposed on the display panel. The UI section 30 displays various information on the display panel of the UI section 30 according to the control of the processor 10. In the present embodiment, the processor 10 controls the UI section 30 and can receive an input of the user to soft keys provided on the capacitive touch panel or mechanical keys provided on the UI section 30. The processor 10 performs a process corresponding to the input content.

The communication section 40 includes various removable memories mounted on the printing device 1 and an interface circuit for communicating with a device connected to the printing device 1 by wire or wirelessly. The processor 10 can acquire a file recorded in a device connected via the communication section 40 as a print target.

The printing section 50 includes actuators, sensors, drive circuits, mechanical parts, and the like for performing printing on a print medium by an ink jet method. In the present embodiment, the printing device 1 includes an accumulating portion (not shown) that accumulates fabric in a roll shape, and the fabric can be pulled out by a transport mechanism (not shown) and can be transported along a predetermined transport path. The printing section 50 can record a recording material on the fabric that has reached a printing position in the process of transportation and perform printing.

Figure 2:
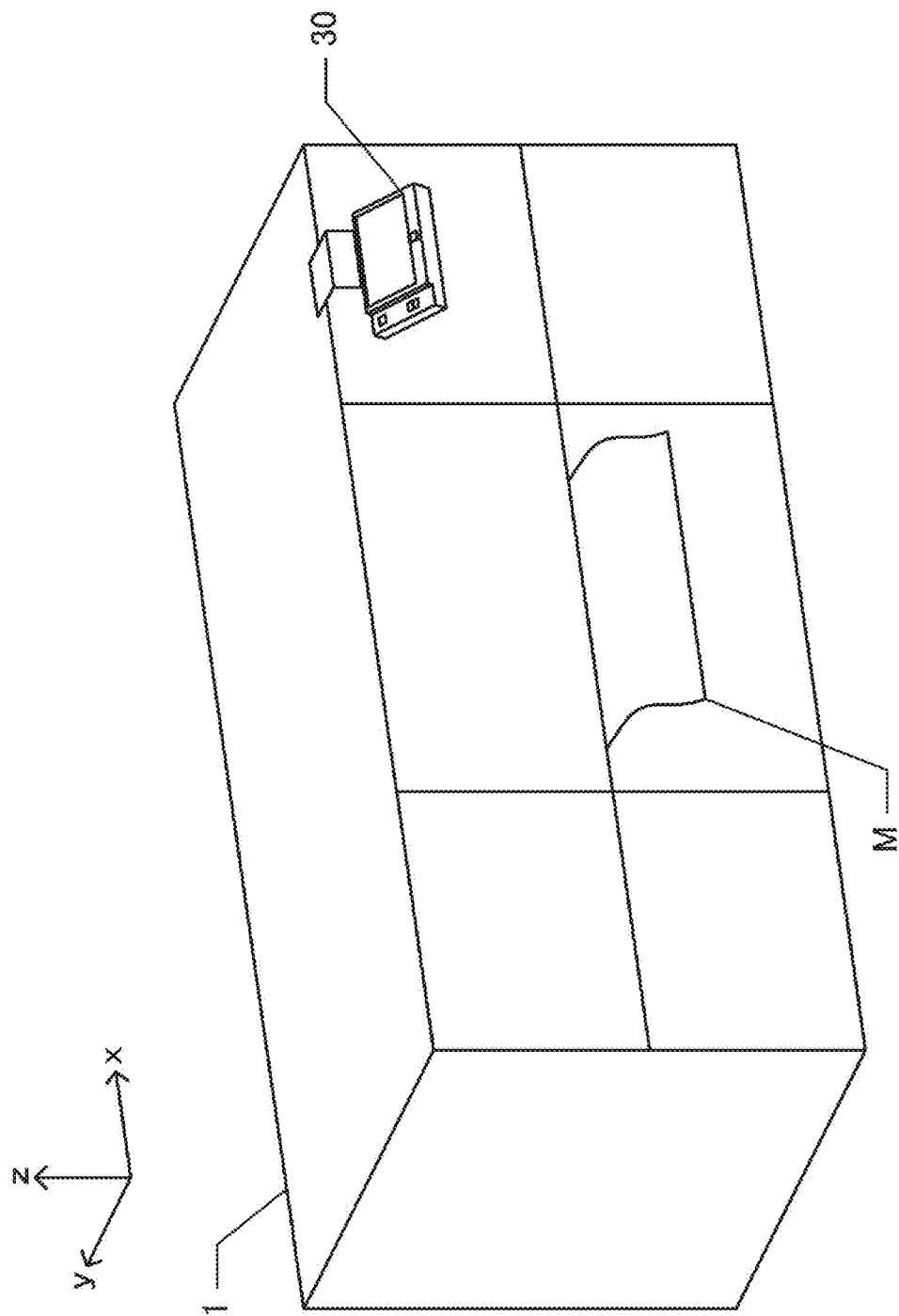
FIG. 2 is a diagram showing the appearance of a printing device.

FIG. 2 is a diagram showing the appearance of the printing device 1 according to the present embodiment. As shown in FIG. 2, the printing device 1 according to the present embodiment has a substantially rectangular parallelepiped housing, and the printing section 50 or the like is provided inside the housing. In the present embodiment, x, y, and z axes are defined in the directions parallel to each side of the rectangular parallelepiped. In FIG. 2, the diagonally upper right side of the drawing is a positive direction of the x-axis, the diagonally upper left side of the drawing is a positive direction of the y-axis, and the upper side of the drawing is a z direction. The printing device 1 has the largest surface, and a discharge port for the fabric as a print medium M is provided at the center of one surface parallel to an xz plane. The print medium M after printing is discharged from the discharge port. The UI section 30 is provided at the upper part on the positive direction side of the x-axis when viewed from the discharge port. In the present embodiment, the UI section 30 is attached to the printing device 1 so that the UI section 30 is inclined with respect to the surface of the housing of the printing device 1.

Figure 3:
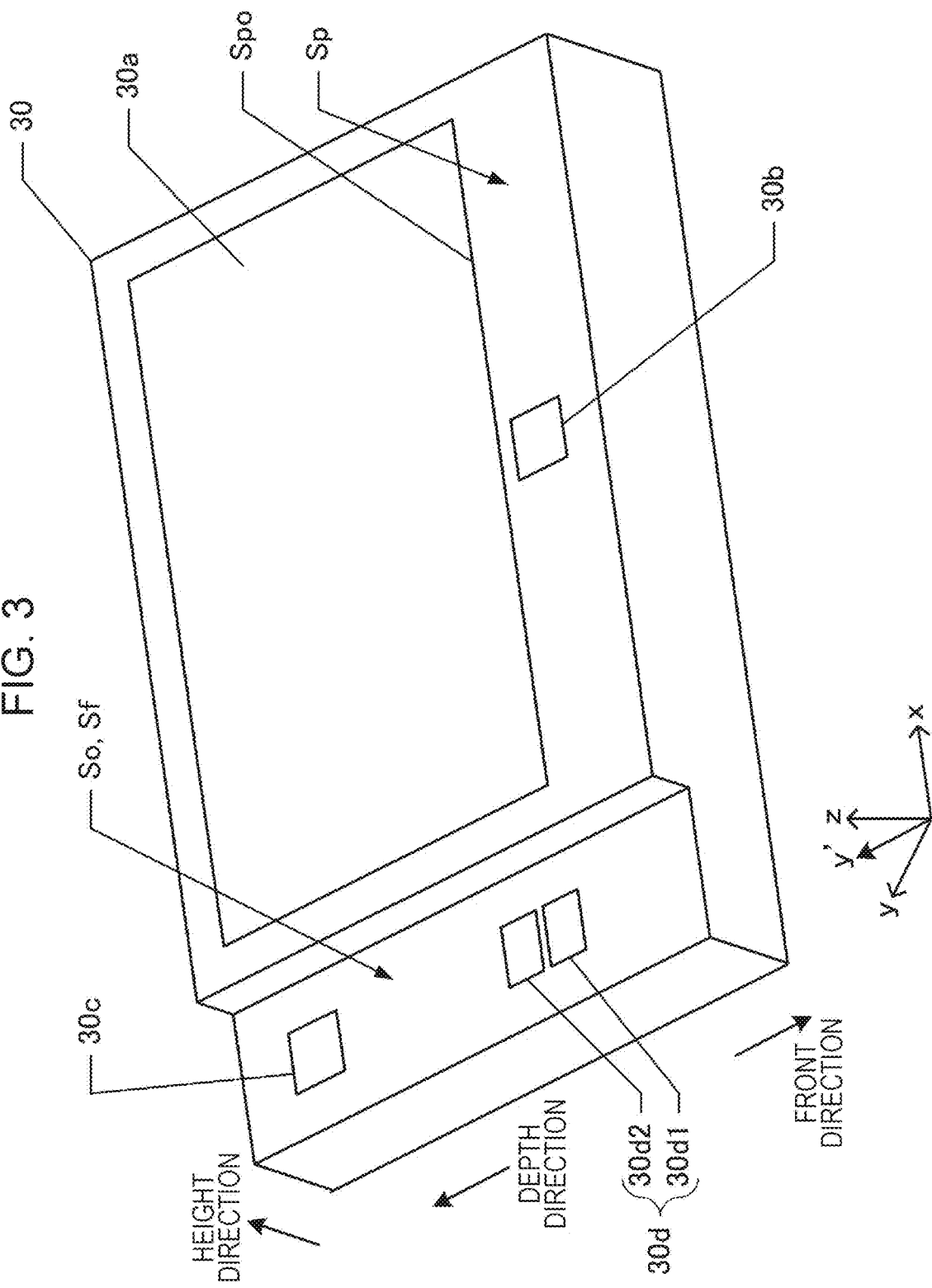
FIG. 3 is a diagram showing the appearance of a UI section.

FIG. 3 is a diagram showing the appearance of the UI section 30. The UI section 30 includes an capacitive touch panel 30*a*, a home operation portion 30*b*, a power supply operation portion 30*c*, and a transport operation portion 30*d*. The power supply operation portion 30*c* is a mechanical key for shifting a power state of the printing device 1. In the present embodiment, the power state is on or off. Therefore, when the power of the printing device 1 is turned off and the user presses the power supply operation portion 30*c*, the power state shifts to on and the processor 10 performs a start sequence. When the start sequence is completed, the printing device 1 can perform various functions. When the power of the printing device 1 is turned on and the user presses the power supply operation portion 30*c*, the processor 10 performs a shutdown sequence. When the shutdown sequence is completed, the power state shifts to off.

The home operation portion 30*b* is a mechanical key for transitioning from a screen other than a basic screen to the basic screen. In the present embodiment, the basic screen is a screen displayed as the first operable screen after the printing device 1 is started. That is, when the start sequence of the printing device 1 is completed, the processor 10 causes the capacitive touch panel 30*a* to display the basic screen based on the image data recorded in the non-volatile memory 20. Although various screens are displayed on the capacitive touch panel 30*a* by the user's operation, when the user presses the home operation portion 30*b* while a screen other than the basic screen is displayed, the processor 10 causes the capacitive touch panel 30*a* to display the basic screen.

The transport operation portion 30*d* includes a mechanical key for operating a transport position of a print medium for printing. In the present embodiment, the transport operation portion 30*d* includes a forward transport operation portion 30*d*1 and a reverse transport operation portion 30*d*2. The forward transport operation portion 30*d*1 is a mechanical key for transporting the medium in a positive direction, which is one of the transport directions of the print medium. The reverse transport operation portion 30*d*2 includes a mechanical key for transporting the medium in a direction opposite to the positive direction. In the present embodiment, the direction in which the print medium is transported when printing is performed on the print medium (the transport direction toward the discharge port) is the positive direction. When the user presses the forward transport operation portion 30*d*1, the processor 10 controls a transport mechanism (not shown) to transport the print medium in the positive direction with a transport amount corresponding to the period during which the pressing operation is performed. When the user presses the reverse transport operation portion 30*d*2, the processor 10 controls a transport mechanism (not shown) to transport the print medium in the reverse direction with a transport amount corresponding to the period during which the pressing operation is performed.

In the present embodiment, each of the home operation portion 30*b*, the power supply operation portion 30*c*, the forward transport operation portion 30*d*1, and the reverse transport operation portion 30*d*2 is composed of one push button, which is one mechanical key. Of course, each operation portion may include a plurality of mechanical keys and other objects, such as characters and Braille.

The user stands in a position where the capacitive touch panel 30*a* can be visually recognized and touch-operates the capacitive touch panel 30*a* and each operation portion. When the user stands in a position where the UI section 30 is visually recognized in order to use the printing device 1, the left-right direction when viewed from the user is parallel to an x direction shown in FIG. 2. Further, a front-rear direction when viewed from the user is parallel to a y direction shown in FIG. 2.

As described above, the UI section 30 is attached so as to be inclined with respect to the surface of the housing of the printing device 1. Therefore, the surface of the capacitive touch panel 30*a* in the UI section 30 is not parallel to either the xz plane or a yz plane. That is, the longitudinal direction of the capacitive touch panel 30*a* is parallel to the left-right direction and the x direction when viewed from the user, but the lateral direction of the capacitive touch panel 30*a* is not parallel to either the z direction or the y direction. In the present embodiment, one of the lateral directions of the capacitive touch panel 30*a* (a positive direction of a y' axis shown in FIG. 3) is referred to as a depth direction. That is, although it is the direction toward the back side when viewed from the user who uses the printing device 1, the direction parallel to the surface of the capacitive touch panel 30*a* is referred to as a depth direction. The direction opposite to the depth direction is a front direction.

In the present embodiment, the processor 10 causes the capacitive touch panel 30*a* to display various screens by the program recorded in the non-volatile memory 20. In the present embodiment, a plurality of screens form a hierarchical structure, and a screen in the uppermost hierarchy is one type of basic screen. When the user performs a touch operation on an operation portion set in the basic screen, a screen in the lower hierarchy corresponding to the operation portion is displayed. There may be a plurality of screens in the second hierarchy or lower.

Figure 4:
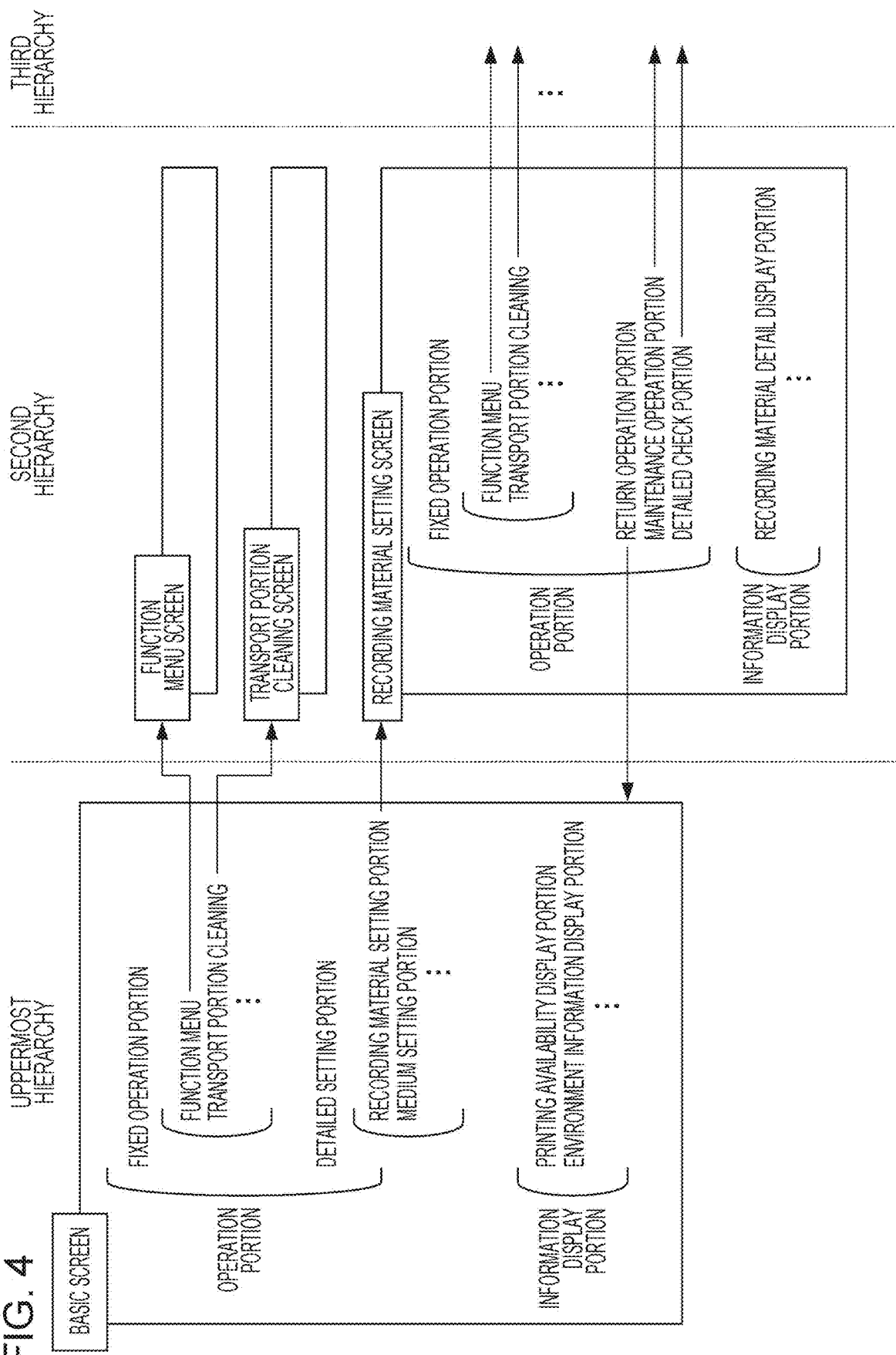
FIG. 4 is a diagram showing a hierarchical structure of screens.

FIG. 4 is a diagram showing a hierarchical structure of screens in the present embodiment. In FIG. 4, the uppermost hierarchy is shown on the left side, the second hierarchy is shown on the right side of the uppermost hierarchy, and the third hierarchy is shown on the right side of the second hierarchy. Of course, there may be hierarchies of the third hierarchy or lower. In addition, in FIG. 4, some of a plurality of screens are shown in detail. In the present embodiment, an operation portion and an information display portion are present in each screen. The operation portion is a part including soft keys that can be operated by the user, and the soft keys, which are areas in which various information is displayed and the detection of a touch operation by the user is effective are set therein. In the information display portion, various information is displayed, but soft keys are not included.

In FIG. 4, the content of each screen is indicated by the characters in the rectangle. As shown in FIG. 4, an operation portion and an information display portion are present in the basic screen according to the present embodiment, and the operation portion includes a fixed operation portion and a detailed setting portion. The information display portion includes, for example, a printing availability display portion that indicates whether or not printing is available in the printing device 1 and an environmental information display portion that displays environmental information such as temperature and humidity detected by a sensor (not shown) included in the printing device 1.

Figure 5:
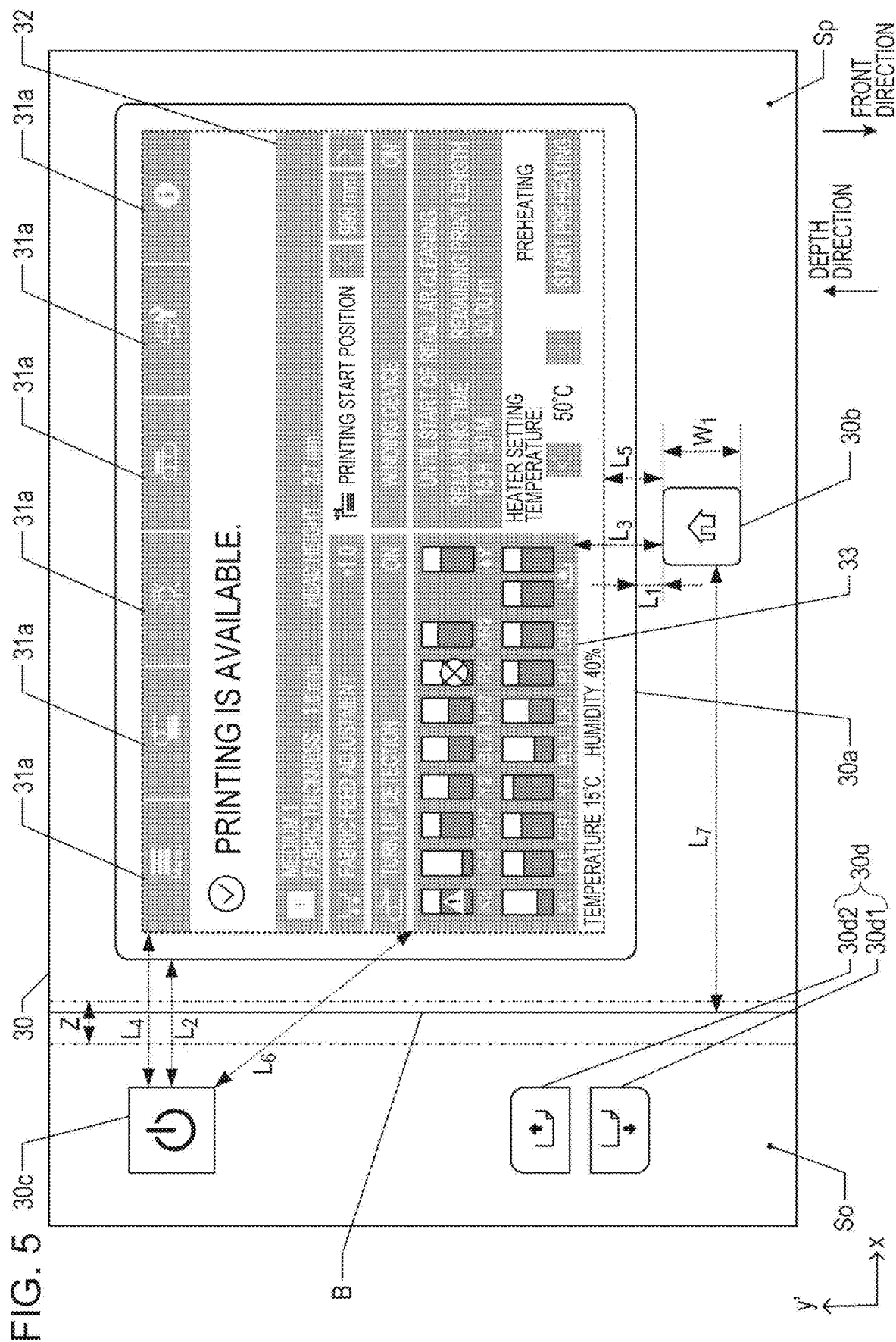
FIG. 5 is a diagram showing an example of a basic screen.

The fixed operation portion is an operation portion that is common to a plurality of screens and is displayed at a fixed position. The detailed setting portion may be different for each of the plurality of screens. FIG. 5 is an example of a basic screen displayed on the capacitive touch panel 30*a*. In the example shown in FIG. 5, the soft keys on the capacitive touch panel 30*a* are colored gray. In the present embodiment, a fixed operation portion 31*a* is composed of a plurality of soft keys and the soft keys are displayed side by side along the upper side of the displayable area of the capacitive touch panel 30*a*. Although the broken line shown in FIG. 5 indicates a boundary of the displayable area, the boundary is not explicitly displayed on the capacitive touch panel 30*a*.

The fixed operation portion 31*a* is an operation portion that displays a screen for giving an instruction for and checking detailed settings in the printing device 1, and is displayed on all screens in the present embodiment. FIG. 5 shows an example in which six fixed operation portions 31*a* are present. The transition destination by the fixed operation portion 31*a* is not limited, but in the examples shown in FIGS. 4 and 5, there are menu buttons for displaying a selection list on the setting screen of various functions, a transport portion cleaning that displays a screen for giving an instruction for cleaning of a transport portion, and the like.

In the detailed setting portion, some of items for which parameters can be set in the printing device 1 are displayed to be selectable. The example shown in FIG. 5 includes a medium setting portion 32 and the like for transitioning to a screen for making settings related to the print medium. Further, in the present embodiment, the basic screen includes a recording material setting portion 33 for displaying information on the remaining amount of the recording material and transitioning to the screen for making settings related to the recording material.

The information on the remaining amount of the recording material is shown by a bar graph formed of rectangles indicating the capacity of an ink tank and a rectangle indicating the remaining amount. That is, these rectangles are displayed for each color of the recording materials, and are configured so that a relative relationship between the capacity of the ink tank and the remaining amount can be understood. The processor 10 acquires the remaining amount of the recording material in the ink tank for each color of the recording materials by using a sensor (not shown). The processor 10 displays the information on the remaining amount for each color of the recording materials at a default position on the basic screen based on the acquired remaining amount. Also, in the example shown in FIG. 5, information indicating a defect, for example, an icon indicating that the product cannot be used or an icon indicating a warning is superimposed on the information on the remaining amount of the recording material of each color.

When a touch operation is performed on each operation portion, the processor 10 specifies the touch-operated operation portion and specifies a screen associated with the specified operation portion. The processor 10 refers to the non-volatile memory 20, controls the capacitive touch panel 30*a* based on image data for generating the specified screen, and displays the screen.

Figure 6:
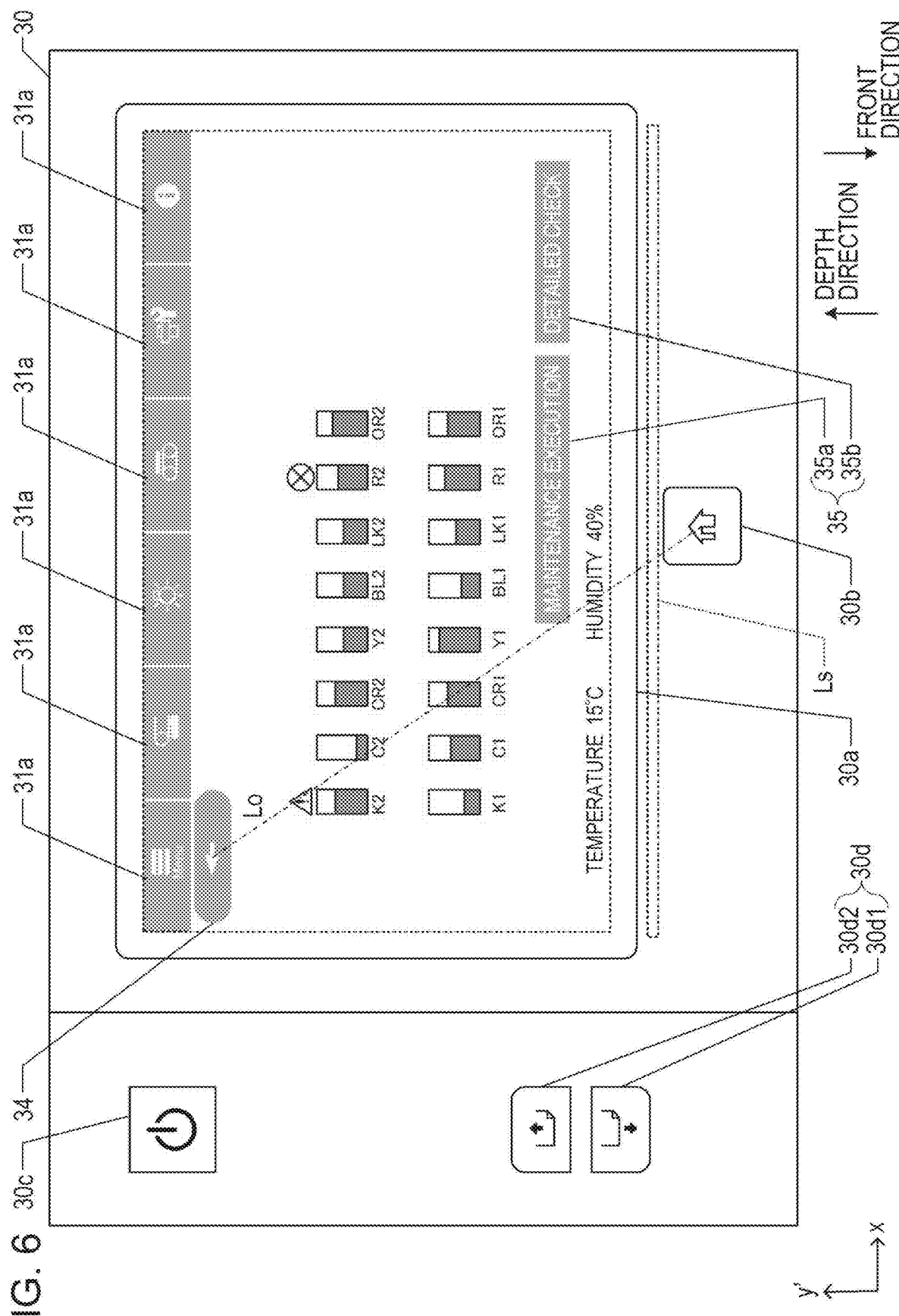
FIG. 6 is a diagram showing an example of a screen.

FIG. 6 is an example of a recording material setting screen displayed when the user performs a touch operation on the recording material setting portion 33 on the basic screen shown in FIG. 5. Also on the recording material setting screen shown in FIG. 6, the soft keys on the capacitive touch panel 30*a* are colored in gray, and the boundary of the displayable area is indicated by a broken line, as in the example shown in FIG. 5. As shown in FIG. 4, the recording material setting screen also includes an operation portion and an information display portion.

The information display portion of the recording material setting screen includes a recording material detail display portion and the like that show the information on the remaining amount for each color of the recording materials displayed on the basic screen. In the recording material detail display portion, information indicating the remaining amount for each color of the recording materials is shown in the same manner as in FIG. 5. Further, an icon indicating a defect or the like is displayed in association with the information on the remaining amount of the recording material of each color. In the recording material detail display portion, a status for each color may be displayed in more detail than the basic screen.

The operation portion of the recording material setting screen includes a fixed operation portion 31*a*, a return operation portion 34, a maintenance operation portion 35*a* as an in-screen operation portion 35, and a detailed check portion 35*b*. As described above, the fixed operation portion 31*a* is the same as the fixed operation portion 31*a* on the basic screen. The return operation portion 34 is a soft key for transitioning from the displayed screen to an original screen. The return operation portion 34 is an operation portion for returning to the screen displayed before the transition to the displayed screen, and is an operation portion for returning to the basic screen in the case of the recording material setting screen shown in FIG. 6. The return operation portion 34 is displayed in all hierarchies of the second hierarchy or lower.

The maintenance operation portion 35*a* is an operation portion for giving an instruction to start maintenance of the mechanism for recording the recording material on the print medium. When the user performs a touch operation on the maintenance operation portion 35*a*, the processor 10 performs maintenance such as cleaning of an ejection nozzle of the recording material. Of course, in the printing device 1 capable of giving an instruction for the details of maintenance, the screen may be changed to the screen for giving an instruction for the details of maintenance in response to the touch operation on the maintenance operation portion 35*a*.

The detailed check portion 35*b* is an operation portion for giving an instruction for a transition to a screen for checking in detail the remaining amount of the recording material for each color, the state of the mechanism for ejecting the recording material, and the like. When the user performs a touch operation on the detailed check portion 35*b*, the processor 10 acquires detailed information such as information on the remaining amount for each color of the recording materials and defects for each recording material, and displays the detailed information on the screen after the transition.

As in the above example, in the present embodiment, the processor 10 causes the capacitive touch panel 30*a* to display one of the screens defined to have a hierarchical structure, and can perform the screen transition according to the input of the user.

In the present embodiment, as described above, the user can perform various operations by the operation portions of the mechanical keys or the soft keys provided in the UI section 30. As shown in FIG. 5 and the like, these operation portions are used for giving instructions having a large number and various contents. Therefore, when there is no consideration regarding the positional relationship between the operation portion and the surrounding objects, the operability may deteriorate.

For example, when the printing device 1 is normally used, the user does not normally operate the power supply operation portion 30c. However, when there is no consideration regarding the positional relationship between the power supply operation portion 30c and other operation portions, the user may touch the power supply operation portion 30c due to an erroneous operation, and the power state of the printing device 1 may shift. Therefore, in the present embodiment, various considerations are made so that the operability of the operation portion is not deteriorated.

2. Disposition for Improving Operability

In the present embodiment, the home operation portion 30b is closer to the capacitive touch panel 30a than the power supply operation portion 30c in a state where the UI section 30 is viewed along a direction perpendicular to a display panel surface of the capacitive touch panel 30a. That is, in the xy' plane shown in FIG. 3, the home operation portion 30b is closer to the capacitive touch panel 30a than the power supply operation portion 30c. Specifically, as shown in FIG. 5, a distance $L_1$ between the home operation portion 30b and the capacitive touch panel 30a is shorter than a distance $L_2$ between the power supply operation portion 30c and the capacitive touch panel 30a.

The distance between the operation portions can be evaluated by various indexes, for example, by the shortest distance. Further, in the present embodiment, the distance between the capacitive touch panel 30a and the operation portion is the distance between an edge portion of the capacitive touch panel 30a and an edge portion of the operation portion which are visible on the UI section 30. In the present embodiment, the capacitive touch panel 30a, the home operation portion 30b, and the power supply operation portion 30c are rectangular or substantially rectangular, and their sides are parallel to the x direction or a y' direction. Therefore, the distance between them is the distance in the x direction or the y' direction.

In the present embodiment, the home operation portion 30b is closer to the operation portion on the capacitive touch panel 30a than the power supply operation portion 30c. Specifically, the distance between the recording material setting portion 33, which is the operation portion closest to the home operation portion 30b among the operation portions on the capacitive touch panel 30a, and the home operation portion 30b is defined as a distance $L_3$. Further, the distance between the fixed operation portion 31a at the left end, which is the operation portion closest to the power supply operation portion 30c among the operation portions on the capacitive touch panel 30a, and the power supply operation portion 30c is defined as a distance $L_4$. At this time, the distance $L_3$<distance $L_4$ is satisfied.

Further, in the present embodiment, the home operation portion 30b is closer to the displayable area of the capacitive touch panel 30a than the power supply operation portion 30c. Specifically, the distance between a lower edge portion of the displayable area of the capacitive touch panel 30a and the home operation portion 30b is defined as a distance $L_5$. Further, the distance between the left edge portion of the displayable area on the capacitive touch panel 30a and the power supply operation portion 30c is the distance $L_4$. At this time, the distance $L_5$<distance $L_4$ is satisfied.

In the present embodiment, since the home operation portion 30b is closer to the capacitive touch panel 30a than the power supply operation portion 30c, it is easy to perform an operation of moving a finger back and forth between the soft key on the capacitive touch panel 30a and the home operation portion 30b. The home operation portion 30b is an operation portion for switching a screen other than the basic screen displayed on the capacitive touch panel 30a to the basic screen. Therefore, it is easier for the user to move his/her finger between the home operation portion 30b and the capacitive touch panel 30a than to move his/her finger between the power supply operation portion 30c and the capacitive touch panel 30a. Therefore, the user can easily input while moving his/her finger between the home operation portion 30b and the capacitive touch panel 30a.

It is less likely that the user will turn off the power of the printing device 1 while performing various inputs to the UI section 30. Therefore, since the power supply operation portion 30c is disposed farther from the capacitive touch panel 30a than the home operation portion 30b, it is less likely that the user erroneously operates the power supply operation portion 30c while using the printing device 1. Further, the power supply operation portion 30c is present on the back side of the home operation portion 30b when viewed from the user. Therefore, the power supply operation portion 30c is disposed at a position farther from the user than the home operation portion 30b. Therefore, it is less likely that the user erroneously operates the power supply operation portion 30c while using the printing device 1.

Further, the home operation portion 30b is an operation portion for switching the screen to the basic screen. Therefore, when an operation is performed on the home operation portion 30b, it is highly likely that the user is trying to perform an operation on the soft key on the basic screen after switching, a check of information on the basic screen, and the like. When the home operation portion 30b is closer to the capacitive touch panel 30a than the power supply operation portion 30c, the user can easily operate the home operation portion 30b while keeping both the home operation portion 30b and the capacitive touch panel 30a in the field of view. Accordingly, it is possible to operate the soft keys on the basic screen in the capacitive touch panel 30a and check the information on the basic screen without having to move the line of sight a large number of times. Therefore, it is possible to provide a user interface that is easy to operate.

Further, in the present embodiment, the fixed operation portion 31a is displayed along the upper side of the displayable area on all the screens on the capacitive touch panel 30a. That is, the fixed operation portion 31a is also displayed on screens other than the basic screen. Therefore, it is less likely that the operation is performed on the fixed operation portion 31a that was displayed even before the screen transition by the operation on the fixed operation portion 31a immediately after the user performs the operation on the home operation portion 30b.

Therefore, in the present embodiment, the fixed operation portion 31a is disposed at the farthest position (in the depth direction) when viewed from the home operation portion 30b among all the operation portions displayed on the screen of the capacitive touch panel 30a. According to this configuration, the operation portion operated immediately after the operation on the home operation portion 30b and the information checked immediately after the operation on the home operation portion 30b can be disposed relatively close to the home operation portion 30b. Therefore, it becomes easy to perform the operation immediately after the operation on the home operation portion 30b and the check of the information.

Further, the distance $L_1$ between the capacitive touch panel 30a and the home operation portion 30b is smaller than a width $W_1$ of the mechanical key of the home operation portion 30b. In the present embodiment, the width $W_1$ is the length of the mechanical key of the home operation portion 30b in the depth direction, but the length in the depth direction and the length in the left-right direction of the mechanical key are the same. The width of the mechanical key of the home operation portion 30b is set to be slightly larger than the area touched by the fingertip so that the home operation portion 30b can be operated with the fingertip of one finger of the user.

Therefore, when the distance $L_1$ between the capacitive touch panel 30a and the home operation portion 30b is smaller than the width $W_1$ of the mechanical key of the home operation portion 30b, the distance $L_1$ between the capacitive touch panel 30a and the home operation portion 30b is a distance equivalent to the width of the fingertip. Therefore, when the finger is moved by a distance equivalent to the width of the fingertip after the operation on the home operation portion 30b, the finger can be moved to the capacitive touch panel 30a. Therefore, the touch operation on the capacitive touch panel 30a is possible only by moving the finger by a short moving distance. Therefore, the operation using the home operation portion 30b and the soft keys on the capacitive touch panel 30a can be easily performed.

Further, the distance $L_2$ between the capacitive touch panel 30a and the power supply operation portion 30c is larger than the width $W_1$ of the mechanical key of the home operation portion 30b. Therefore, in order to perform a touch operation on the power supply operation portion 30c after the touch operation on the capacitive touch panel 30a is performed, it is necessary to move the finger at least over a distance longer than the width of the fingertip. That is, the user cannot touch the power supply operation portion 30c without moving his/her finger from the capacitive touch panel 30a to some extent. Therefore, it is possible to reduce the likelihood that the user unintentionally and erroneously operates the power supply operation portion 30c.

Further, in the present embodiment, a light source Ls that illuminates the capacitive touch panel 30a from the back surface of the panel is located at the end of the capacitive touch panel 30a on the home operation portion 30b side. In FIG. 6, the position of the light source Ls is schematically shown by a broken line rectangle. In the present embodiment, the capacitive touch panel 30a is an edge light type liquid crystal display device. The light source Ls is disposed on one side of the display panel of the capacitive touch panel 30a inside the UI section 30, and the entire surface of the display panel is illuminated by a light guide plate or the like. In the present embodiment, the light source Ls is located at the end of the capacitive touch panel 30a on the home operation portion 30b side. That is, in FIG. 6, it is disposed at the lower end of the capacitive touch panel 30a.

The light source Ls is a light source that illuminates the entire surface of the capacitive touch panel 30a, and is accompanied by a reflector or the like for guiding light to the back surface of the panel. Therefore, a certain amount of space is required around the light source Ls. On the other hand, since the home operation portion 30b includes a mechanical key, a mechanism constituting the mechanical key, a circuit for detecting the on/off of the mechanical key, and the like are required, and a certain amount of space is required.

As described above, in order to provide the light source Ls and the home operation portion 30b inside the UI section 30, a space corresponding to each mechanism is required. When the light source Ls and the home operation portion 30b are disposed in different directions when viewed from the capacitive touch panel 30a, for example, on the upper side and the lower side, spaces are required in different directions, respectively. However, as shown in FIG. 6, when the light source Ls and the home operation portion 30b are disposed in the same direction when viewed from the capacitive touch panel 30a, the light source Ls and the home operation portion 30b can be disposed in a state where the space required by each is shared with each other. As a result, the space occupied by the capacitive touch panel 30a and the home operation portion 30b can be reduced, and the UI section 30 can be made compact.

Further, in the present embodiment, the information on the remaining amount in the basic screen is displayed at a position closer to the home operation portion 30b than the power supply operation portion 30c in the screen. In the example shown in FIG. 5, the information on the remaining amount is displayed on the recording material setting portion 33, and the distance between the power supply operation portion 30c and the recording material setting portion 33 is a distance $L_6$. The distance between the home operation portion 30b and the recording material setting portion 33 is the distance $L_3$. The distance $L_6$ between the power supply operation portion 30c and the recording material setting portion 33 is the shortest distance between the power supply operation portion 30c and the recording material setting portion 33, and the distance $L_3$ between the home operation portion 30b and the recording material setting portion 33 is the shortest distance between the home operation portion 30b and the recording material setting portion 33.

The home operation portion 30b is an operation portion for switching a screen other than the basic screen to the basic screen. Therefore, after operating the home operation portion 30b, it is highly likely that the user has the intention to check the information in the basic screen or the like. When the information on the remaining amount is closer to the home operation portion 30b than the power supply operation portion 30c, immediately after the touch operation while visually recognizing the home operation portion 30b, the information on the remaining amount can be checked with a smaller amount of movement of the line of sight than immediately after the touch operation while visually recognizing the power supply operation portion 30c.

In addition, the basic screen includes a plurality of soft keys, the information on the remaining amount includes a soft key, and the soft key included in the information on the remaining amount is closest to the home operation portion 30b among all the soft keys displayed on the basic screen. That is, the recording material setting portion 33 on the basic screen shows the information on the remaining amount for each color by a rectangle showing the remaining amount for each color of the recording materials. Since the recording material setting portion 33 is also a soft key for receiving a touch operation for transitioning to a screen for making settings related to the recording material, the recording material setting portion 33 showing the information on the remaining amount includes the soft key.

In addition to the recording material setting portion 33, the basic screen shown in FIG. 5 includes operation portions such as the medium setting portion 32 that receives touch operations by the user, and these operation portions are colored in gray. These operation portions are soft keys for giving an instruction for screen transitions to lower hierarchies. Then, in the present embodiment, as shown in FIG. 5, the operation portion (soft key) closest to the home operation portion 30b is the recording material setting portion 33.

The home operation portion 30b is an operation portion for switching a screen other than the basic screen to the basic screen. Therefore, after operating the home operation portion 30b, it is highly likely that the user has the intention to operate the operation portion in the basic screen. When the recording material setting portion 33 among the operation portions is closest to the home operation portion 30b, immediately after the touch operation on the home operation portion 30b, the touch operation on the recording material setting portion 33 can be performed only by moving a shorter distance than the other operation portions. Therefore, the user can very easily perform the touch operation on the recording material setting portion 33 immediately after the touch operation on the home operation portion 30b.

In the present embodiment, as described above, the distance $L_3$ from the home operation portion 30b to the recording material setting portion 33, which is the operation portion on the basic screen at the shortest distance, is smaller than the distance $L_4$ from the power supply operation portion 30c to the fixed operation portion 31a at the left end, which is the operation portion on the basic screen at the shortest distance. Therefore, immediately after the touch operation on the home operation portion 30b, the touch operation can be performed on the operation portion on the basic screen only by moving a shorter distance than immediately after the touch operation on the power supply operation portion 30c. Therefore, the user can easily operate the operation portion on the basic screen immediately after the touch operation on the home operation portion 30b, and it is less likely that the user erroneously operates the power supply operation portion 30c immediately after operating the operation portion on the basic screen.

In the present embodiment, the disposition of the operation portion is devised even on the screens in lower hierarchies than the basic screen. As shown in FIG. 6, the recording material setting screen displayed by touch-operating the recording material setting portion 33 includes the return operation portion 34 including a soft key for transitioning from the displayed screen to the original screen, and the in-screen operation portion 35 including a soft key other than the return operation portion 34. In the present embodiment, the in-screen operation portion 35 includes the maintenance operation portion 35a and the detailed check portion 35b.

FIG. 6 is an example of a screen on a lower hierarchy than the basic screen, but in the present embodiment, the return operation portion 34 is displayed at the same position on all the screens in the second hierarchy or lower. In the present embodiment, the return operation portion 34 is not displayed on the basic screen. Therefore, when the screen other than the basic screen is a first screen and the basic screen is a second screen, the return operation portion 34 is displayed on the first screen and not displayed on the second screen. In the present embodiment, since the basic screen is the screen in the uppermost hierarchy, when the return operation portion 34 is not displayed on the basic screen, unnecessary operation portions are not disposed in the basic screen and the screen can be used efficiently.

Further, as described above, the fixed operation portion 31a is displayed at the same position on all screens including the basic screen. Therefore, the user can give an execution instruction for the default function listed as the fixed operation portion 31a regardless of the hierarchy of the screen. The in-screen operation portion 35 is an operation portion for giving different instructions depending on the screens of the second hierarchy or lower, and the display positions of the in-screen operation portions 35 in different screens may be different from each other.

In the example shown in FIG. 6, the home operation portion 30b and the return operation portion 34 sandwich the in-screen operation portion 35. Specifically, in FIG. 6, a straight line Lo extending from the center of the home operation portion 30b to the center of the return operation portion 34 is shown by a one-dot chain line. The straight line Lo is a straight line passing through the maintenance operation portion 35a, which is one of the in-screen operation portions 35, and since each operation portion is present in such a positional relationship, the home operation portion 30b and the return operation portion 34 are disposed to sandwich the in-screen operation portion 35.

The straight line for specifying whether or not the home operation portion 30b and the return operation portion 34 sandwich the in-screen operation portion 35 is not limited to the straight line passing through the center of the operation portion, and may be a straight line passing through any position of the operation portion, for example, an end. When a straight line passing through any position in two operation portions passes through another operation portion present between these two operation portions, it can be said that the two operation portions sandwich the other operation portion (the same applies to any operation portion). Further, whether or not the two operation portions sandwich the other operation portion may be specified in a specific direction, for example, in the y' direction or the x direction shown in FIG. 6. For example, in the example shown in FIG. 6, in the y' direction, the home operation portion 30b and the return operation portion 34 sandwich the in-screen operation portion 35.

The home operation portion 30b is an operation portion for returning to the basic screen from a screen other than the basic screen, and the return operation portion 34 is an operation portion for returning to the screen displayed before the transition to the displayed screen. As described above, both the home operation portion 30b and the return operation portion 34 have a function of switching screens to return to the original screen, that is, the immediately preceding screen or the first screen. Therefore, the functions of the home operation portion 30b and the return operation portion 34 are similar functions. On the other hand, the in-screen operation portion 35 such as the maintenance operation portion 35a is an operation portion operated by the user with the intention to select a specific function such as selecting a certain function, although the screen transition may be accompanied.

When the home operation portion 30b and the return operation portion 34 sandwich the in-screen operation portion 35 as in the present embodiment, the home operation portion 30b and the return operation portion 34 are present on opposite sides when viewed from the in-screen operation portion 35. Therefore, the home operation portion 30b and the return operation portion 34 having similar functions are not in a state of being adjacent to each other. When the operation portions having similar functions are adjacent to each other, the user tends to make an erroneous operation in which the user operates one in a state where the user intends to operate the other. However, according to the present embodiment, it is possible to reduce the likelihood that the user who intends to perform a touch operation on one of the operation portions having similar functions erroneously performs a touch operation on the other operation portion. In particular, when the user becomes accustomed to the operation of the UI section 30, it can be recognized that the positions of the home operation portion 30b and the return operation portion 34 are clearly different, so that the likelihood of an erroneous operation can be reduced.

In the present embodiment, the return operation portion 34 is displayed on the portion near the upper side of the capacitive touch panel 30a, and the home operation portion 30b is disposed on the front side of the capacitive touch panel 30a. Therefore, the return operation portion 34 and the home operation portion 30b are present on opposite sides of each other when viewed from the center of the capacitive touch panel 30a. Therefore, it is possible to reduce the likelihood that the user who intends to perform a touch operation on one of the operation portions having a similar function erroneously performs a touch operation on the other operation portion.

Figure 7:
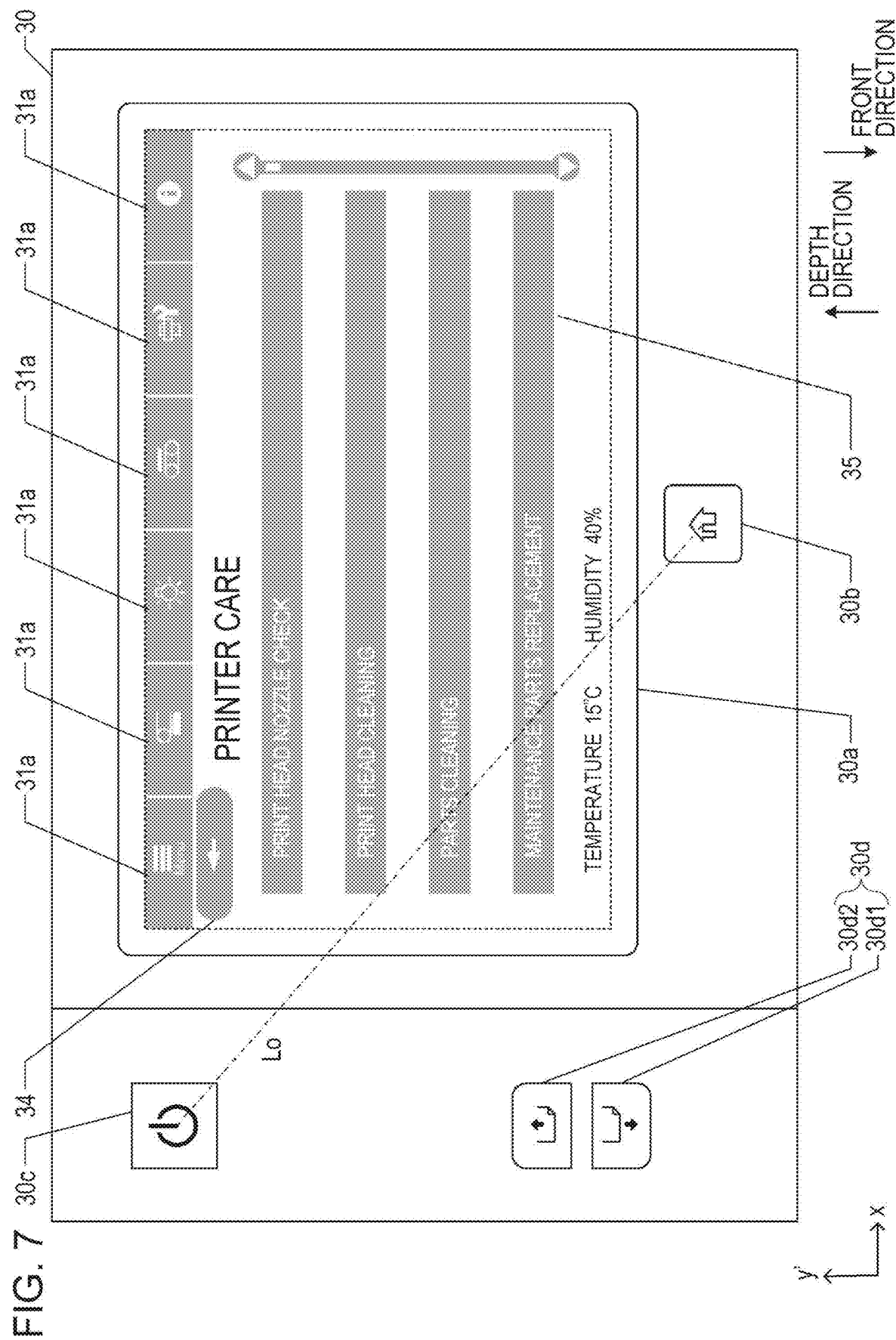
FIG. 7 is a diagram showing an example of a screen.

Further, the screen in the present embodiment also includes a screen in which the home operation portion 30b and the power supply operation portion 30c sandwich the in-screen operation portion 35. FIG. 7 is a diagram showing an example of a maintenance screen that can be displayed on the capacitive touch panel 30a in the present embodiment. The maintenance screen is displayed, for example, in response to a touch operation on the maintenance operation portion 35a shown in FIG. 6. Also on the maintenance screen, the soft keys on the capacitive touch panel 30a are colored in gray, and the boundary of the displayable area is shown by a broken line, as in the example shown in FIG. 5. The maintenance screen also includes an operation portion that can be touch-operated and an information display portion that cannot be touch-operated.

In the information display portion of the maintenance screen, characters such as screen description (printer care) and information such as temperature and humidity are displayed. The operation portion of the maintenance screen includes a fixed operation portion 31a, a return operation portion 34, and an in-screen operation portion 35. The in-screen operation portion 35 is an operation portion for inputting an execution instruction for maintenance and the like of the printing device 1, and includes, for example, an operation portion for giving an execution instruction for "print head nozzle check", an execution instruction for "maintenance parts replacement", and the like. The fixed operation portion 31a is the same as the fixed operation portion 31a of the basic screen shown in FIG. 5, and the return operation portion 34 is the same as the return operation portion 34 of the recording material setting screen shown in FIG. 6.

In the maintenance screen shown in FIG. 7, a straight line Lo extending from the center of the home operation portion 30b to the center of the power supply operation portion 30c is shown by a one-dot chain line. As shown in FIG. 7, the straight line Lo passes through at least one of the in-screen operation portions 35. Therefore, the home operation portion 30b and the power supply operation portion 30c sandwich the in-screen operation portion 35. According to this configuration, the home operation portion 30b and the power supply operation portion 30c are present in opposite directions when viewed from the in-screen operation portion 35. Further, both the home operation portion 30b and the power supply operation portion 30c include a mechanical key and are provided outside the capacitive touch panel 30a.

Therefore, in the configuration shown in FIG. 7, the home operation portion 30b and the power supply operation portion 30c are not in a state of being adjacent to each other. According to this configuration, it is possible to reduce the likelihood that the user who intends to perform a touch operation on one of the home operation portion 30b and the power supply operation portion 30c erroneously performs a touch operation on the other operation portion.

Although the home operation portion 30b can be frequently operated in the process of using the printing device 1, the power supply operation portion 30c is less likely to be operated in the process of using the printing device 1. When the home operation portion 30b and the power supply operation portion 30c are disposed close to each other, it is highly likely that a touch operation is erroneously performed on the power supply operation portion 30c when a touch operation is performed on the home operation portion 30b. However, when the home operation portion 30b and the power supply operation portion 30c are configured to sandwich the in-screen operation portion 35 as in the present embodiment, it is possible to reduce the likelihood of an erroneous operation on the power supply operation portion 30c.

Further, the screen in the present embodiment includes a screen in which the home operation portion 30b and the in-screen operation portion 35 are located at the same position in the longitudinal direction of the capacitive touch panel 30a. For example, in any of the screens shown in FIGS. 6 and 7, when the home operation portion 30b is virtually moved in the y' direction perpendicular to the x direction, which is the longitudinal direction of the capacitive touch panel 30a, the home operation portion 30b overlaps the in-screen operation portion 35. Although the return operation portion 34 is not displayed on the basic screen shown in FIG. 5, when the operation portion displayed on the basic screen (for example, the recording material setting portion 33) is regarded as an in-screen operation portion different from the return operation portion 34, the home operation portion 30b and the in-screen operation portion are located at the same position in the longitudinal direction of the capacitive touch panel 30a.

As described above, when the home operation portion 30b and the in-screen operation portion 35 are located at the same position in the longitudinal direction of the capacitive touch panel 30a, the finger can be moved between the home operation portion 30b and the in-screen operation portion 35 only by moving the finger in the lateral direction without moving the finger in the longitudinal direction of the capacitive touch panel 30a. Therefore, it becomes easy to touch the in-screen operation portion 35 immediately after the touch operation on the home operation portion 30b, or to touch the home operation portion 30b immediately after the touch operation on the in-screen operation portion 35.

Further, in the present embodiment, the power supply operation portion 30c is located on the back side of the in-screen operation portion 35 in the lateral direction of the capacitive touch panel 30a when viewed from the user who uses the printing device. Specifically, as shown in FIGS. 5 to 7, the power supply operation portion 30c is present on the back side of the in-screen operation portion 35 in the y' direction, which is the lateral direction of the capacitive touch panel 30a. That is, in the y' direction, the side on the back side of the power supply operation portion 30c is present on the further back side than the side on the back side of the in-screen operation portion 35. Therefore, the power supply operation portion 30c is present at a farther position when viewed from the user who uses the printing device 1 than the in-screen operation portion 35, and is possible to reduce the likelihood of an erroneous operation on the power supply operation portion 30c in the process of operating the in-screen operation portion 35.

In addition, as shown in FIGS. 5 to 7, for example, various operation portions are present on the screen in the present embodiment. As shown in FIGS. 5 to 7, the power supply operation portion 30c in the present embodiment is present on the back side of all the operation portions displayed on the screen of the capacitive touch panel 30a. Therefore, in the present embodiment, the power supply operation portion 30c is present on the innermost side of all the operation portions displayed on the screen of the capacitive touch panel 30a. Therefore, the power supply operation portion 30c is present at the position farthest from the user who uses the printing device 1 among all the operation portions of the UI section 30. Therefore, it is possible to reduce the likelihood of erroneously operating the power supply operation portion 30c in the process of operating the operation portions other than the power supply operation portion 30c.

Further, in the present embodiment, the home operation portion 30b and the power supply operation portion 30c, which are mechanical keys, sandwich the capacitive touch panel 30a. For example, when a straight line Lo extending from the home operation portion 30b to the power supply operation portion 30c is virtually considered as in the one-dot chain line shown in FIG. 7, the straight line Lo passes through the capacitive touch panel 30a in the xy' plane. According to this configuration, the capacitive touch panel 30a can be present between the home operation portion 30b and the power supply operation portion 30c. Therefore, the home operation portion 30b and the power supply operation portion 30c can be disposed apart from each other, and it is possible to reduce the likelihood that the power supply operation portion 30c is erroneously operated when the home operation portion 30b is touched. Further, it is possible to reduce the likelihood that the home operation portion 30b is erroneously operated when the power supply operation portion 30c is touched.

Further, in the present embodiment, the home operation portion 30b and the power supply operation portion 30c sandwich the information on the remaining amount displayed on the capacitive touch panel 30a. Specifically, as shown in FIG. 5, since the information on the remaining amount is included in the recording material setting portion 33 displayed on the basic screen, and the recording material setting portion 33 is disposed at the lower left of the basic screen, in the embodiment shown in FIG. 5, the information on the remaining amount is sandwiched between the home operation portion 30b and the power supply operation portion 30c. According to this configuration, the home operation portion 30b and the power supply operation portion 30c can be disposed apart from each other, and it is possible to reduce the likelihood that the power supply operation portion 30c is erroneously operated when the home operation portion 30b is touched. Further, it is possible to reduce the likelihood that the home operation portion 30b is erroneously operated when the power supply operation portion 30c is touched.

Further, in the present embodiment, the mechanical key of the home operation portion 30b is smaller than the mechanical key of the power supply operation portion 30c. According to this configuration, the power supply operation portion 30c can be made more conspicuous than the home operation portion 30b. Since the power supply operation portion 30c is a mechanical key for switching the state where the power of the printing device 1 is off to the state where the power of the printing device 1 is on, it is preferable that the power supply operation portion 30c is an easy-to-understand key when viewed from the user. When the mechanical key of the home operation portion 30b is smaller than the mechanical key of the power supply operation portion 30c, the power supply operation portion 30c can be an easy-to-understand and conspicuous key than the home operation portion 30b. Even though the power supply operation portion 30c is larger than the home operation portion 30b and is thus an easy-to-understand mechanical key, in the present embodiment, the power supply operation portion 30c is disposed at the innermost part of the operation portions, and the home operation portion 30b is disposed at the frontmost part of the operation portions. Therefore, the likelihood that the user touch-operates the power supply operation portion 30c due to an erroneous operation is reduced.

Further, in the present embodiment, a panel installation surface Sp provided with the capacitive touch panel 30a is a surface different from a power supply operation portion installation surface So provided with the power supply operation portion 30c. In FIG. 3, the panel installation surface Sp and the power supply operation portion installation surface So are indicated by arrows. The panel installation surface Sp is a surface provided with an opening Spo for allowing the user to visually recognize the display panel of the capacitive touch panel 30a among the plurality of surfaces constituting the outer surface of the UI section 30. The power supply operation portion installation surface So is a surface to which the mechanical key of the power supply operation portion 30c is attached among a plurality of surfaces constituting the outer surface of the UI section 30.

In the present embodiment, as shown in FIG. 3, the outer shape of the panel installation surface Sp is rectangular. In addition, the panel installation surface Sp is a plane parallel to the xy' plane. On the other hand, the outer shape of the power supply operation portion installation surface So is rectangular. In addition, the power supply operation portion installation surface So is also a plane parallel to the xy' plane. Therefore, in the present embodiment, the panel installation surface Sp and the power supply operation portion installation surface So are parallel. However, the position of the panel installation surface Sp and the position of the power supply operation portion installation surface So are different from each other in a direction perpendicular to the xy' plane (referred to as a height direction). That is, when the UI section 30 is viewed from the user, a step is formed in the height direction, and the panel installation surface Sp is present at a position higher than the power supply operation portion installation surface So (position closer to the user).

As described above, in the present embodiment, the panel installation surface Sp and the power supply operation portion installation surface So are adjacent to each other in the x direction with a step as a boundary. Since a step is present at the boundary between the panel installation surface Sp and the power supply operation portion installation surface So, these surfaces are different surfaces. In this way, when the panel installation surface Sp and the power supply operation portion installation surface So are different surfaces, when viewed from the user, it becomes clear that the panel installation surface Sp and the power supply operation portion installation surface So are disposed discontinuously.

Further, when the panel installation surface Sp and the power supply operation portion installation surface So are different surfaces, it becomes difficult to move the finger from one surface to the other surface. For example, when it becomes easier for the user to recognize that it is a movement of a finger between discontinuous surfaces by touching the boundary of the surface with the finger or by making the boundary visible to the user, it becomes difficult to move the finger from one surface to the other surface. Therefore, it is less likely that the operation portion provided on the power supply operation portion installation surface So is erroneously operated with the intention of operating the operation portion provided on the panel installation surface Sp. Further, it is less likely that the operation portion provided on the panel installation surface Sp is erroneously operated with the intention of operating the operation portion provided on the power supply operation portion installation surface So.

Further, in the present embodiment, a step larger than a stroke of the mechanical key of the home operation portion 30b is present between the panel installation surface Sp and the power supply operation portion installation surface So. That is, the step between the panel installation surface Sp and the power supply operation portion installation surface So is larger than the stroke of the mechanical key of the home operation portion 30b.

The stroke of the mechanical key is a moving distance of the mechanical key in a pressing direction between a state where the mechanical key is not operated and a state where the mechanical key is operated to the maximum in the pressing direction. Therefore, when operating the mechanical key, the moving distance in the height direction of the user's finger is less than or equal to the stroke. Therefore, when the user's finger moves in the pressing direction of the mechanical key beyond the stroke of the mechanical key, the user can recognize that the operation is different from the operation of pressing the mechanical key. Therefore, from the state where the finger is present around the panel installation surface Sp, such as after the operation on the home operation portion 30b, it is possible to reduce the likelihood that the user unintentionally moves his/her finger over the step to move the finger to the power supply operation portion installation surface So to erroneously operate the other operation portion.

Further, in the present embodiment, a step larger than a stroke of the mechanical key of the power supply operation portion 30c is present between the panel installation surface Sp and the power supply operation portion installation surface So. That is, the step between the panel installation surface Sp and the power supply operation portion installation surface So is larger than the stroke of the mechanical key of the power supply operation portion 30c. Thus, when the user's finger moves in the pressing direction of the mechanical key beyond the stroke of the mechanical key, the user can recognize that the operation is different from the operation of pressing the mechanical key. Therefore, from the state where the finger is present around the power supply operation portion installation surface So, such as after the operation on the power supply operation portion 30c, it is possible to reduce the likelihood that the user unintentionally moves his/her finger over the step to move the finger to the panel installation surface Sp to erroneously operate the other operation portion.

Figure 8:
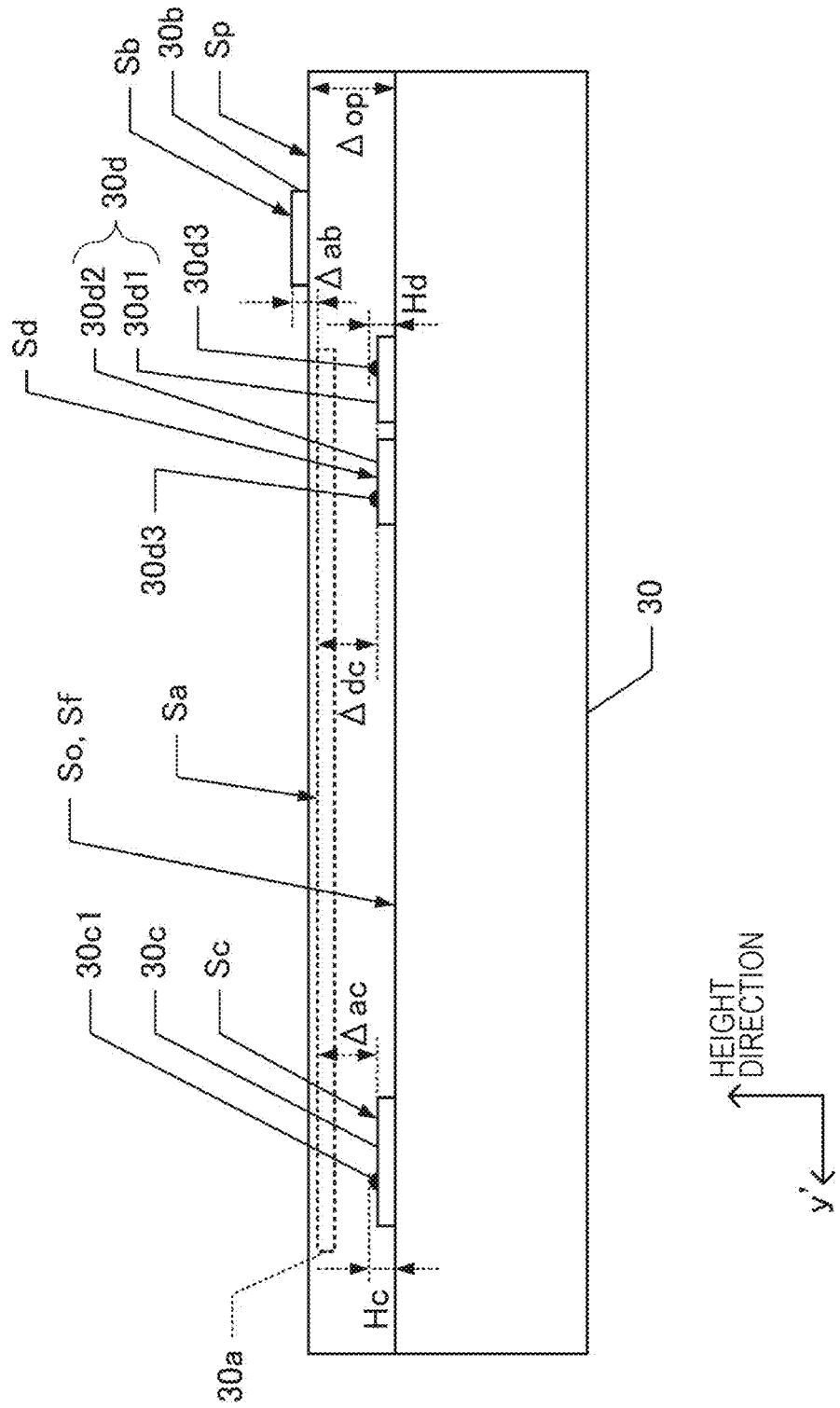
FIG. 8 is a side view of the UI section.

Further, in the present embodiment, a difference in height between a surface Sa of the capacitive touch panel 30a and a surface Sb of the home operation portion 30b in a state where the mechanical key is not operated is smaller than a step between the panel installation surface Sp and the power supply operation portion installation surface So. FIG. 8 is a side view showing a state where the left side of the UI section 30 (a portion where the power supply operation portion 30c is provided) is viewed along a direction parallel to the xy' plane. FIG. 8 shows a state where each operation portion is not operated. In the present embodiment, the surface Sa of the capacitive touch panel 30a is present at a position lower in the height direction than the panel installation surface Sp. The home operation portion 30b has a rectangular parallelepiped outer shape, and the surface touched by the finger is present at the highest position in the height direction in a state where the mechanical key is not operated. As shown in FIG. 8, in the present embodiment, the surface of each mechanical key is configured to be slightly higher than the installation surface in the state where the mechanical key is not operated.

Therefore, the difference in height between the surface Sa of the capacitive touch panel 30a and the surface Sb of the home operation portion 30b in the state where the mechanical key is not operated is a difference Δab shown in FIG. 8. The size of the step between the panel installation surface Sp and the power supply operation portion installation surface So is Δop. As shown in FIG. 8, in the present embodiment, Δab<Δop is satisfied. According to this configuration, the user can move the finger back and forth between the home operation portion 30b and the surface Sa of the capacitive touch panel 30a by simply moving the finger in the height direction by a distance smaller than the size Δop of the step.

When a finger is present around the panel installation surface Sp (for example, around the home operation portion 30b or the operation portion on the screen), the user cannot reach the power supply operation portion 30c without moving his/her finger over the difference Δab in height between the surface Sa of the capacitive touch panel 30a and the surface Sb of the home operation portion 30b by about the size Δop of the step. Therefore, it is possible to reduce the likelihood of an erroneous operation in which the user unintentionally performs a touch operation on the power supply operation portion 30c from the state where the finger is present around the panel installation surface Sp.

Further, in the present embodiment, the difference Δab in height between the surface Sa of the capacitive touch panel 30a and the surface Sb of the home operation portion 30b in a state where the mechanical key is not operated is smaller than a difference Δac in height between the surface Sa of the capacitive touch panel 30a and a surface Sc of the power supply operation portion 30c in a state where the mechanical key is not operated. According to this configuration, it is possible to reduce the likelihood of an erroneous operation in which the user unintentionally performs a touch operation on the power supply operation portion 30c. Specifically, when a finger is present around the panel installation surface Sp (for example, around the home operation portion 30b or the operation portion on the screen), even though the user moves the finger by a distance corresponding to the difference Δab in height, the user cannot reach the power supply operation portion 30c with his/her finger. That is, the user cannot reach the power supply operation portion 30c with his/her finger unless the position of the finger in the height direction is changed by at least a distance corresponding to the difference Δac in height. Therefore, it is possible to reduce the likelihood of an erroneous operation in which the user unintentionally performs a touch operation on the power supply operation portion 30c from the state where the finger is present around the panel installation surface Sp.

Further, in the present embodiment, the surface Sc of the power supply operation portion 30c in the state where the mechanical key is not operated is located at a lower position than the surface Sa of the capacitive touch panel 30a and the panel installation surface Sp. Therefore, in the present embodiment, when the user performs a touch operation on the power supply operation portion 30c, the user needs to move his/her finger farther than the height at which the operation portion on the screen of the capacitive touch panel 30a or the home operation portion 30b provided on the panel installation surface Sp is operated. Therefore, it is possible to reduce the likelihood that the user who is operating the operation portion on the screen of the capacitive touch panel 30a or the home operation portion 30b provided on the panel installation surface Sp touch-operates the power supply operation portion 30c due to an erroneous operation.

Further, in the present embodiment, a step is present between the panel installation surface Sp and the power supply operation portion installation surface So in the central region of the capacitive touch panel 30a and the power supply operation portion 30c. That is, in the present embodiment, for example, when the UI section 30 is viewed along the direction perpendicular to the xy' plane as shown in FIG. 5 and the like, the step, which is a boundary B between the panel installation surface Sp and the power supply operation portion installation surface So, is present near the center between the capacitive touch panel 30a and the power supply operation portion 30c. According to this configuration, the step between the panel installation surface Sp and the power supply operation portion installation surface So can be configured to be present at a position not close to both the capacitive touch panel 30a and the power supply operation portion 30c. As a result, when the user moves his/her finger between the panel installation surface Sp and the power supply operation portion installation surface So, it is possible to prevent the user from being caught in the step.

It is sufficient that the central region where the step is present is a region including the center between the capacitive touch panel 30a and the power supply operation portion 30c. For example, the region or the like in the center when the space between the capacitive touch panel 30a and the power supply operation portion 30c is divided into three equal parts is the central region. Of course, the three equal divisions are an example, and two regions in the center of the region obtained by dividing into four equal parts, a region in the central of the region obtained by dividing into five equal parts, and the like may be the central region. In FIG. 5, a region Z sandwiched by the one-dot chain lines is the central region.

Further, in the present embodiment, the home operation portion 30b is closer to the capacitive touch panel 30a than the step between the panel installation surface Sp and the power supply operation portion installation surface So. That is, as shown in FIG. 5, the distance $L_1$ from the home operation portion 30b to the capacitive touch panel 30a is smaller than a distance $L_7$ from the home operation portion 30b to the boundary B. Since the step is the boundary between the panel installation surface Sp and the power supply operation portion installation surface So, the power supply operation portion 30c is located on the opposite side of the home operation portion 30b with the boundary in the x direction.

Therefore, according to the configuration in which the distance $L_1$ is smaller than the distance $L_7$, the home operation portion 30b and the power supply operation portion 30c can be disposed far from each other, and the home operation portion 30b can be disposed near the capacitive touch panel 30a. Therefore, it is easy for the user to move his/her finger between the home operation portion 30b and the capacitive touch panel 30a to operate the operation portion. Further, it is possible to reduce the likelihood of an erroneous operation in which the user erroneously operates the power supply operation portion 30c in a state where the finger is present near the home operation portion 30b or the capacitive touch panel 30a.

Further, in the present embodiment, when it is considered that the home operation portion 30b is located in a first direction of the capacitive touch panel 30a and the power supply operation portion 30c is located in a second direction of the capacitive touch panel 30a, the first direction and the second direction are orthogonal or opposite directions. In the present embodiment, the first direction and the second direction are orthogonal axes parallel to the sides of the rectangular screen of the capacitive touch panel, that is, directions along the x-axis and the y' axis.

Specifically, in the example shown in FIG. 5, since the home operation portion 30b is present in a negative direction of the y' axis when viewed from the capacitive touch panel 30a, the negative direction of the y' axis is the first direction. Since the power supply operation portion 30c is present in a negative direction in the x-axis direction when viewed from the capacitive touch panel 30a, the negative direction in the x-axis direction is the second direction. Since the y' axis and the x-axis are orthogonal to each other, the first direction and the second direction are orthogonal directions. According to this configuration, it is possible to prevent the home operation portion 30b and the power supply operation portion 30c from being disposed in the same direction when viewed from the capacitive touch panel 30a.

Therefore, it is possible to reduce the likelihood that the power supply operation portion 30c is erroneously operated when the home operation portion 30b is touched. Further, it is possible to reduce the likelihood that the home operation portion 30b is erroneously operated when the power supply operation portion 30c is touched. It is sufficient that the first direction and the second direction are different directions, and they may be opposite directions. Even though the first direction and the second direction are opposite directions, it is possible to reduce the likelihood that the power supply operation portion 30c is erroneously operated when the home operation portion 30b is touched. Further, it is possible to reduce the likelihood that the home operation portion 30b is erroneously operated when the power supply operation portion 30c is touched.

In the present embodiment, the first direction is the front direction of the user who uses the printing device 1. Therefore, the home operation portion 30b can be disposed at a position close to the user, and the user can easily operate the home operation portion 30b. The second direction is the left direction of the user who uses the printing device 1. Since people are statistically right-handed, if the second direction is the left direction when viewed from the user, the power supply operation portion 30c is present in a direction that is statistically difficult for many people to touch with their dominant hand. Therefore, it is possible to reduce the likelihood of erroneous operation of the power supply operation portion 30c.

Further, in the present embodiment, the step between the capacitive touch panel 30a and the power supply operation portion 30c extends in the first direction. In the present embodiment, the first direction is the front direction of the user who uses the printing device 1, and the second direction is the direction orthogonal to the first direction, which is the left-right direction of the user. Therefore, the presence of the step extending in the first direction makes it possible to form a step extending in the direction of dividing the second direction from the capacitive touch panel 30a toward the power supply operation portion 30c. Therefore, the user can clearly grasp that the capacitive touch panel 30a and the power supply operation portion 30c are distinguished from each other.

Further, the recording material setting portion 33 including the information on the remaining amount displayed on the basic screen is present on the frontmost side in the first direction among all the soft keys displayed on the basic screen, in the basic screen. Specifically, in the present embodiment, the recording material setting portion 33 is disposed on the frontmost side in the y' direction among all the soft keys. According to this configuration, the recording material setting portion 33 can be disposed at a position on the basic screen that is most easily operated by the user.

Further, the recording material setting portion 33 including the information on the remaining amount displayed on the basic screen is present on the leftmost side in the second direction among all the soft keys displayed on the basic screen, in the basic screen. Specifically, in the present embodiment, the recording material setting portion 33 is disposed on the leftmost side in the x direction among all the soft keys. In the present embodiment, the forward transport operation portion 30d1, the reverse transport operation portion 30d2, and the like are disposed on the left side of the capacitive touch panel 30a, and the operation portion is not disposed on the right side of the capacitive touch panel 30a. Therefore, by disposing the recording material setting portion 33 on the left side on the screen of the capacitive touch panel 30a, it is possible to reduce the moving distance of the user's finger required when operating the recording material setting portion 33, the home operation portion 30b, the forward transport operation portion 30d1, the reverse transport operation portion 30d2, and the like.

Further, in the present embodiment, a panel installation surface Sp provided with the capacitive touch panel 30a is a surface different from a transport operation portion installation surface Sf provided with the transport operation portion 30d. In the present embodiment, the power supply operation portion installation surface So and the transport operation portion installation surface Sf are the same surface. As shown in FIG. 3, the panel installation surface Sp is a rectangular plane parallel to the xy' plane. The outer shape of the transport operation portion installation surface Sf is also rectangular, and is a plane parallel to the xy' plane. Therefore, in the present embodiment, the panel installation surface Sp and the transport operation portion installation surface Sf are parallel. However, the position of the panel installation surface Sp and the position of the transport operation portion installation surface Sf are different from each other in the direction perpendicular to the xy' plane (referred to as the height direction). That is, when the UI section 30 is viewed from the user, a step is formed in the height direction, and the panel installation surface Sp is present at a position higher than the transport operation portion installation surface Sf (position closer to the user).

As described above, in the present embodiment, the panel installation surface Sp and the transport operation portion installation surface Sf are adjacent to each other in the x direction with a step as a boundary. Since a step is present at the boundary between the panel installation surface Sp and the transport operation portion installation surface Sf, these surfaces are different surfaces. In this way, when the panel installation surface Sp and the transport operation portion installation surface Sf are different surfaces, when viewed from the user, it becomes clear that the panel installation surface Sp and the transport operation portion installation surface Sf are disposed discontinuously.

Further, when the panel installation surface Sp and the transport operation portion installation surface Sf are different surfaces, it becomes difficult to move the finger from one surface to the other surface. For example, when it becomes easier for the user to recognize that it is a movement of a finger between discontinuous surfaces by touching the boundary of the surface with the finger or by making the boundary visible to the user, it becomes difficult to move the finger from one surface to the other surface. Therefore, it is less likely that the operation portion provided on the transport operation portion installation surface Sf is erroneously operated with the intention of operating the operation portion provided on the panel installation surface Sp. Further, it is less likely that the operation portion provided on the panel installation surface Sp is erroneously operated with the intention of operating the operation portion provided on the transport operation portion installation surface Sf. In the present embodiment, since the power supply operation portion installation surface So and the transport operation portion installation surface Sf are the same surface, the power supply operation portion 30c and the transport operation portion 30d can be installed on the same surface, and these operation portions can be efficiently disposed in the UI section 30.

Further, in the present embodiment, the forward transport operation portion 30d1 and the reverse transport operation portion 30d2 included in the transport operation portion 30d are arranged in the transport direction of the print medium. Specifically, when printing is performed by the printing device 1, the print medium M is discharged from the center of the surface of the housing of the printing device 1 on which the UI section 30 is installed, as shown in FIG. 2. Since the user operates the UI section 30 while standing at a position where the UI section 30 can be visually recognized, the print medium M is discharged while being transported to the front side when viewed from the user who uses the printing device 1. Therefore, if the positive direction, which is the transport direction at the time of discharge, is regarded as the front side when viewed from the user, the reverse direction of the transport direction can be regarded as the back side when viewed from the user.

In the present embodiment, the forward transport operation portion 30d1 is a mechanical key for transporting the print medium M in the positive direction, which is the discharge direction of the printed print medium M, and is disposed on the front side of the reverse transport operation portion 30d2. The reverse transport operation portion 30d2 is a mechanical key for transporting the print medium M in the reverse direction, and is disposed on the back side of the forward transport operation portion 30d1. Therefore, the mechanical key for transporting the print medium M to the front side is disposed on the front side, and the mechanical key for transporting the print medium M to the back side is disposed on the back side.

According to this configuration, it is sufficient that the user touches the mechanical key on the front side when transporting the print medium M to the front side, and touches the mechanical key on the back side when transporting the print medium M to the back side. Therefore, the user can intuitively perform the operation as compared with the case where the disposition of the forward transport operation portion 30d1 and the reverse transport operation portion 30d2 is different from the disposition of the present embodiment, such as when the disposition is reversed in the y' direction. Since the print medium M is in the form of a sheet and it is difficult to strictly specify the transport direction, the transport direction may be defined in a state of being projected onto a specific plane, for example, an xy' plane.

Further, the forward transport operation portion 30d1 and the reverse transport operation portion 30d2 are located at the same position in the left-right direction of the user who uses the printing device. In the present embodiment, since the user's left-right direction is the x direction shown in FIG. 3, when the forward transport operation portion 30d1 and the reverse transport operation portion 30d2 are located at the same position in the left-right direction, they are in a state of being arranged along the y' direction. Specifically, the mechanical key included in the transport operation portion 30$d$ and the mechanical key included in the power supply operation portion 30$c$ are arranged in a row.

In the present embodiment, the transport direction of the print medium M is a direction along the y' direction, that is, a front direction and a depth direction. Therefore, when the forward transport operation portion 30$d$1 and the reverse transport operation portion 30$d$2 are located at the same position in the left-right direction, these operation portions are arranged side by side along the transport direction. Therefore, the user can intuitively perform the operation as compared with the case where the forward transport operation portion 30$d$1 and the reverse transport operation portion 30$d$2 are located at different positions in the left-right direction.

Further, in the present embodiment, an interval between the forward transport operation portion 30$d$1 and the reverse transport operation portion 30$d$2 is narrower than an interval between the transport operation portion 30$d$ and the power supply operation portion 30$c$. According to this configuration, the user can easily intuitively understand that the forward transport operation portion 30$d$1 and the reverse transport operation portion 30$d$2 belonging to the transport operation portion 30$d$ are operation portions having a pair of functions. Further, it is possible to reduce the likelihood that the user who intends to operate the transport operation portion 30$d$ erroneously operates the power supply operation portion 30$c$.

Further, in the present embodiment, as shown in FIG. 8, the difference in height between the surface of the capacitive touch panel 30$a$ and the surface of the transport operation portion 30$d$ in a state where the mechanical key is not operated is defined as $\Delta$dc. In this case, the difference $\Delta$dc in height is smaller than the difference $\Delta$ab in height between the surface of the capacitive touch panel 30$a$ and the surface in a state where the home operation portion 30$b$, which is a mechanical key provided on the panel installation surface Sp, is not operated. According to this configuration, it is possible to reduce the likelihood of an erroneous operation in which the user unintentionally performs a touch operation on the transport operation portion 30$d$.

Specifically, when a finger is present around the panel installation surface Sp (for example, around the home operation portion 30$b$ or the operation portion on the screen), even though the user moves the finger by a distance corresponding to the difference $\Delta$ab in height, the user cannot reach the transport operation portion 30$d$ with his/her finger. That is, the user cannot reach the transport operation portion 30$d$ with his/her finger unless the position of the finger in the height direction is changed by at least a distance corresponding to the difference $\Delta$dc in height. Therefore, it is possible to reduce the likelihood of an erroneous operation in which the user unintentionally performs a touch operation on the transport operation portion 30$d$ from the state where the finger is present around the panel installation surface Sp.

Further, in the present embodiment, the power supply operation portion 30$c$ is located at the central portion or on the back side of the central portion in the depth direction of the capacitive touch panel 30$a$ when viewed from the user who uses the printing device. In the present embodiment, the power supply operation portion 30$c$ is located on the back side of the capacitive touch panel 30$a$ in the depth direction (lateral direction, y' direction) from the central portion (center in the depth direction) of the capacitive touch panel 30$a$. According to this configuration, the power supply operation portion 30$c$ can be disposed far from the user, and the likelihood of an erroneous operation on the power supply operation portion 30$c$ can be reduced. Even when the power supply operation portion 30$c$ is present in the central portion in the depth direction, many other operation portions are disposed on the front side with respect to the user, so that the likelihood of an erroneous operation on the power supply operation portion 30$c$ can be reduced.

Further, the transport operation portion 30$d$ is located at the central portion or on the front side of the central portion in the depth direction of the capacitive touch panel 30$a$ when viewed from the user who uses the printing device. In the present embodiment, the transport operation portion 30$d$ is located on the front side of the capacitive touch panel 30$a$ in the depth direction (lateral direction, y' direction) from the central portion (center in the depth direction) of the capacitive touch panel 30$a$. According to this configuration, the transport operation portion 30$d$ can be disposed near the user, and the user can easily operate the transport operation portion 30$d$. Further, it is possible to reduce the likelihood of an erroneous operation on another operation portion, for example, the power supply operation portion 30$c$, when the transport operation portion 30$d$ is operated. Even when the transport operation portion 30$d$ is present in the central portion in the depth direction, the transport operation portion 30$d$ can be easily operated because the user is not far from the transport operation portion 30$d$.

Further, in the direction orthogonal to the transport direction of the print medium, the transport operation portion 30$d$ and the print medium are located on the same side of the capacitive touch panel 30$a$. That is, as shown in FIG. 3, in the UI section 30, the transport operation portion 30$d$ is present on the left side (the negative direction side of the x-axis) when viewed from the user. Also, the discharge port of the print medium M in the printing device 1 is present on the left side of the UI section 30 as shown in FIG. 2. Therefore, the transport operation portion 30$d$ and the print medium M are located on the same side as viewed from the capacitive touch panel 30$a$. Therefore, by looking at the left side, the user can operate the transport operation portion 30$d$ with the transport operation portion 30$d$ included in the same field of view while capturing the print medium M in the field of view. Therefore, it is not necessary to check the transport condition of the print medium M every time the transport operation portion 30$d$ is performed, and the print medium M can be easily transported.

Further, in the present embodiment, a step larger than a stroke of the mechanical key of the transport operation portion 30$d$ is present between the panel installation surface Sp and the transport operation portion installation surface Sf. That is, the step $\Delta$op between the panel installation surface Sp and the transport operation portion installation surface Sf is larger than the stroke of the mechanical key of the transport operation portion 30$d$. When the user's finger moves in the pressing direction of the mechanical key beyond the stroke of the mechanical key, the user can recognize that the operation is different from the operation of pressing the mechanical key. Therefore, from the state where the finger is present around the transport operation portion installation surface Sf, such as after the operation on the transport operation portion 30$d$, it is possible to reduce the likelihood that the user unintentionally moves his/her finger over the step to move the finger to the panel installation surface Sp to erroneously operate the other operation portion.

Further, in the present embodiment, as shown in FIG. 8, a difference $\Delta$dc in height between the surface Sa of the capacitive touch panel 30$a$ and a surface Sd of the transport operation portion 30d in a state where the mechanical key is not operated is smaller than a step Δop between the panel installation surface Sp and the transport operation portion installation surface Sf. In this configuration, in order to operate the operation portion on the capacitive touch panel 30a after the operation of the transport operation portion 30d, the user needs to make the amount of movement of his/her finger after the operation of the transport operation portion 30d larger than the difference Δdc in height and go over the step Δop. According to this configuration, it is possible to reduce the likelihood of an erroneous operation in which the user unintentionally performs a touch operation on the operation portion of the screen of the capacitive touch panel 30a from the state where the finger is present around the transport operation portion 30d.

In the present embodiment, a step is present between the panel installation surface Sp and the transport operation portion installation surface Sf in the central region of the capacitive touch panel 30a and the transport operation portion 30d. That is, in the present embodiment, for example, when the UI section 30 is viewed along the direction perpendicular to the xy' plane as shown in FIG. 5 and the like, the step, which is a boundary B between the panel installation surface Sp and the transport operation portion installation surface Sf, is present near the center between the capacitive touch panel 30a and the transport operation portion 30d. According to this configuration, the step between the panel installation surface Sp and the transport operation portion installation surface Sf can be configured to be present at a position not close to both the capacitive touch panel 30a and the transport operation portion 30d. As a result, when the user moves his/her finger between the panel installation surface Sp and the transport operation portion installation surface Sf, it is possible to prevent the user from being caught in the step.

It is sufficient that the central region where the step is present is a region including the center between the capacitive touch panel 30a and the transport operation portion 30d. For example, the region or the like in the center when the space between the capacitive touch panel 30a and the transport operation portion 30d is divided into three equal parts is the central region. Of course, the three equal divisions are an example, and two regions in the center of the region obtained by dividing into four equal parts, a region in the central of the region obtained by dividing into five equal parts, and the like may be the central region. In FIG. 5, the region Z sandwiched by the one-dot chain lines is the central region, but the fact that the region Z is not limited to the central region when the space between the capacitive touch panel 30a and the transport operation portion 30d is divided into three equal parts is as described above.

Further, the screen in the present embodiment includes a screen in which the transport operation portion 30d and the in-screen operation portion 35 are located at the same position in the lateral direction of the capacitive touch panel 30a. For example, in any of the screens shown in FIGS. 6 and 7, when the transport operation portion 30d is virtually moved in the x direction perpendicular to the y' direction, which is the lateral direction of the capacitive touch panel 30a, the transport operation portion 30d overlaps the in-screen operation portion 35. Although the return operation portion 34 is not displayed on the basic screen shown in FIG. 5, when the operation portion displayed on the basic screen is regarded as an in-screen operation portion different from the return operation portion 34, the transport operation portion 30d and the in-screen operation portion are located at the same position in the lateral direction of the capacitive touch panel 30a.

As described above, when the transport operation portion 30d and the in-screen operation portion 35 are located at the same position in the lateral direction of the capacitive touch panel 30a, the finger can be moved between the transport operation portion 30d and the in-screen operation portion 35 only by moving the finger in the longitudinal direction without moving the finger in the lateral direction of the capacitive touch panel 30a. Therefore, it becomes easy to touch the in-screen operation portion 35 immediately after the touch operation on the transport operation portion 30d, or to touch the transport operation portion 30d immediately after the touch operation on the in-screen operation portion 35.

3. Other Embodiments

The above embodiment is an example for carrying out the present disclosure, and various other embodiments can be employed. The printing device may be a printing device that performs printing on a print medium other than the fabric, for example, paper. Further, the size of the printing device may be smaller or larger than that of the above-described embodiment. The printing device may be a device having a function other than the printing device, for example, a multifunction device capable of performing at least one of a fax function, a scanning function, a copying function, and the like. Further, the aspect of the UI section 30 is not limited to the above-described embodiment. For example, the outer shape of the UI section 30 may have a shape different from that of the above-described embodiment, or the panel installation surface Sp may have a direction different from that of the above-described embodiment, for example, a direction parallel to the horizontal direction.

Further, the display mode of the operation portion is an example, and various modes may be employed. For example, the basic screen includes a plurality of soft keys, the information on the remaining amount includes a soft key, and the soft key included in the information on the remaining amount may have a configuration closest to the power supply operation portion 30c among all the soft keys displayed on the basic screen. Examples of such a configuration include the configuration shown in FIG. 9. In the example shown in FIG. 9, the recording material setting portion 33 is displayed in an edge of the upper left portion of the basic screen. Therefore, the recording material setting portion 33, which is a soft key including the information on the remaining amount, is closest to the power supply operation portion 30c among all the soft keys.

According to this configuration, after the user visually recognizes the power supply operation portion 30c and performs an operation, the user can check the information on the remaining amount by a small movement of the line of sight on the basic screen displayed immediately after the printing device 1 is started. Further, after the user visually recognizes and operates the power supply operation portion 30c, the user can perform a touch operation on the recording material setting portion 33 after a small moving distance of his/her finger on the basic screen displayed immediately after the printing device 1 is started.

Figure 9:
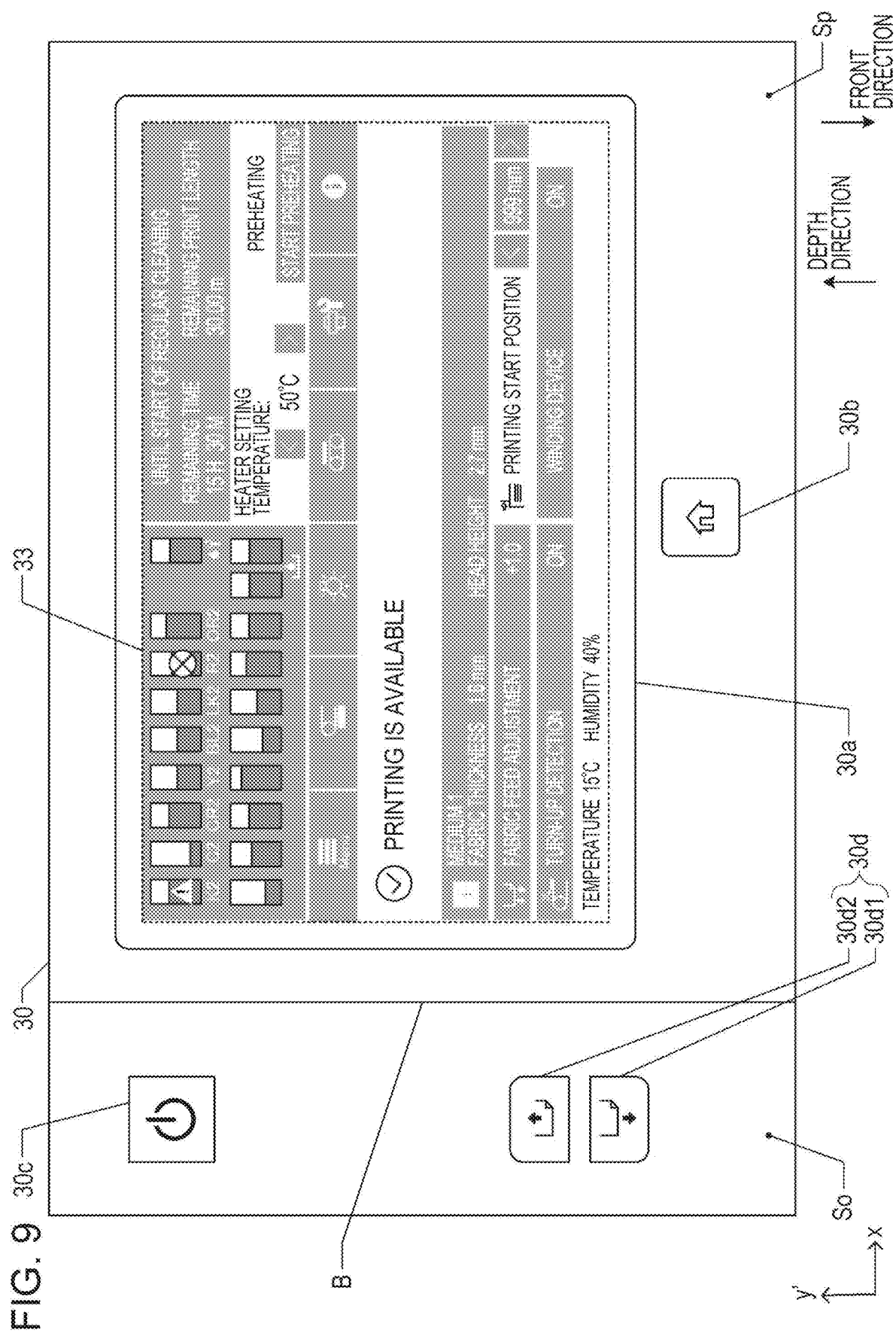
FIG. 9 is a diagram showing an example of a screen.

In the above-mentioned printing device 1, the power supply operation portion 30c and the return operation portion 34 may be configured to sandwich the in-screen operation portion 35. Such a configuration is realized, for example, by the screen shown in FIG. 10. In the screen shown in FIG. 10, the return operation portion 34 is disposed on the upper right side of the screen. Other configurations are the same as the screen shown in FIG. 7. However, since the fixed operation portion 31a shown in FIG. 9 is an operation portion other than the return operation portion 34, it can be considered to be an in-screen operation portion 35, and is described as the in-screen operation portion 35 in FIG. 10.

Figure 10:
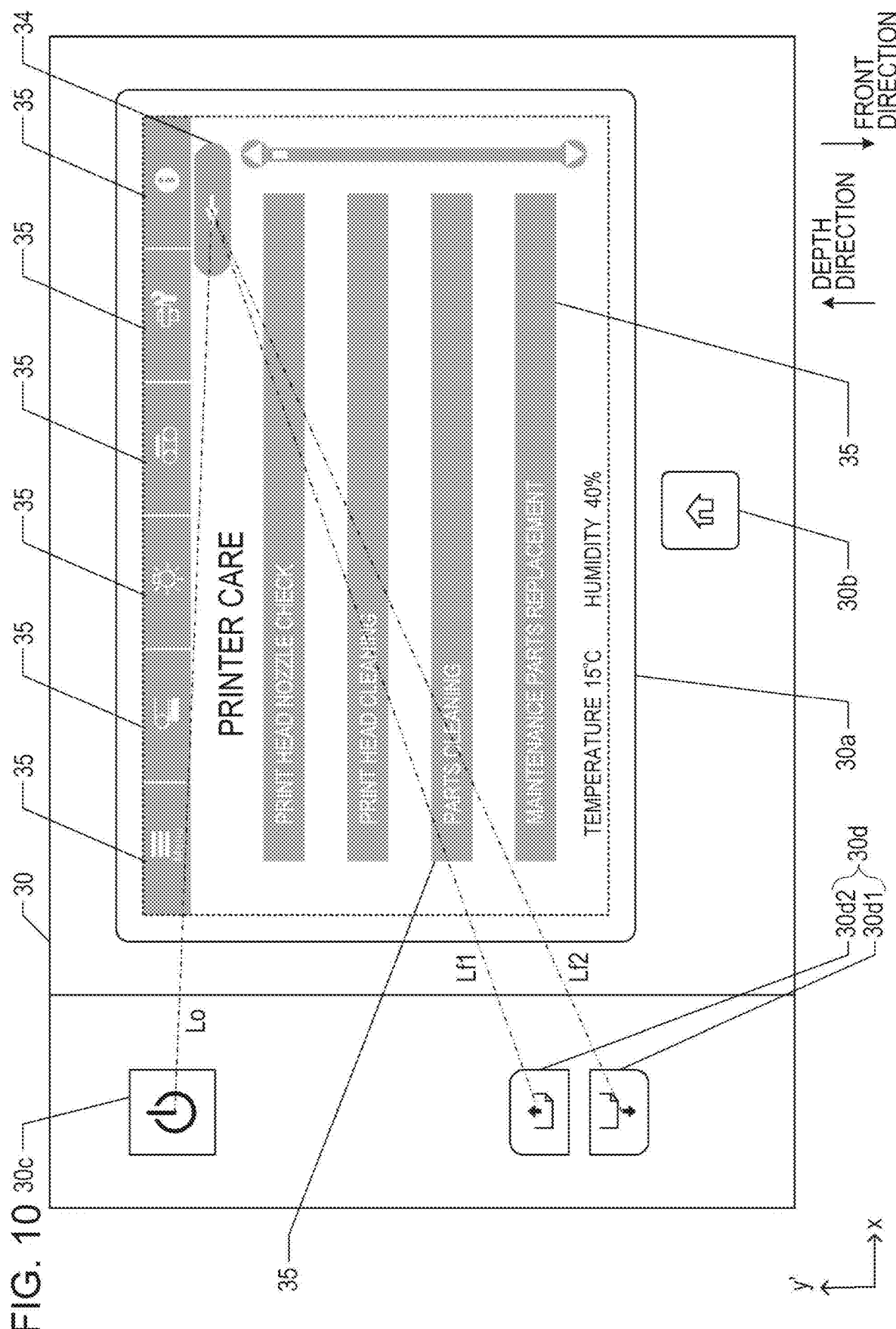
FIG. 10 is a diagram showing an example of a screen.

In such an example shown in FIG. 10, the power supply operation portion 30c and the return operation portion 34 sandwich the in-screen operation portion 35. That is, the straight line Lo indicated by the one-dot chain line extending from the center of the power supply operation portion 30c to the center of the return operation portion 34 passes through the in-screen operation portion 35. The return operation portion 34 is an operation portion for returning to the screen displayed before the transition to the displayed screen. In a user interface that gives various instructions while transitioning through a plurality of screens having a hierarchical structure, such a return operation portion 34 may be frequently touch-operated.

When the power supply operation portion 30c and the return operation portion 34 sandwich the in-screen operation portion 35 as in the present embodiment, the power supply operation portion 30c and the return operation portion 34 are present on opposite sides when viewed from the in-screen operation portion 35. Therefore, the power supply operation portion 30c and the return operation portion 34 are not in a state of being adjacent to each other, and the power supply operation portion 30c and the return operation portion 34 can be disposed apart from each other. According to this configuration, it is possible to reduce the likelihood that a user who intends to perform a touch operation on the return operation portion 34, which may be frequently touch-operated, erroneously operates the power supply operation portion 30c.

Further, in the example shown in FIG. 10, the transport operation portion 30d and the return operation portion 34 sandwich the in-screen operation portion 35. That is, straight lines Lf1 and Lf2 shown by a two-dot chain line extending from the center of the forward transport operation portion 30d1 and the reverse transport operation portion 30d2 constituting the transport operation portion 30d to the center of the return operation portion 34 pass through the in-screen operation portion 35. The return operation portion 34 is an operation portion for returning to the screen displayed before the transition to the displayed screen. In a user interface that gives various instructions while transitioning through a plurality of screens having a hierarchical structure, such a return operation portion 34 may be frequently touch-operated. The transport operation portion 30d is an operation portion for transporting the print medium M, and it is less likely that the transport operation portion 30d is operated in the case of the printing process, for example, during printing of a certain image.

When the transport operation portion 30d and the return operation portion 34 sandwich the in-screen operation portion 35 as in the present embodiment, the transport operation portion 30d and the return operation portion 34 are present on opposite sides when viewed from the in-screen operation portion 35. Therefore, the transport operation portion 30d and the return operation portion 34 are not in a state of being adjacent to each other, and the transport operation portion 30d and the return operation portion 34 can be disposed apart from each other. According to this configuration, it is possible to reduce the likelihood that a user who intends to perform a touch operation on the return operation portion 34, which may be frequently touch-operated, erroneously operates the transport operation portion 30d.

Further, Braille may be associated with the mechanical key of the printing device 1. For example, as shown in FIG. 8, the power supply operation portion 30c may include Braille 30c1 representing the function of the mechanical key of the power supply operation portion 30c. In this case, there may be a configuration in which a step $\Delta$op larger than a height Hc of Braille is present between the panel installation surface Sp and the power supply operation portion installation surface So. The height Hc of the Braille 30c1 is the distance in the height direction from the power supply operation portion installation surface So to the apex of the Braille 30c1.

According to this configuration, the user's finger immediately after operating the power supply operation portion 30c based on the Braille 30c1 is present at a position lower than the panel installation surface Sp, which is the apex in the height direction of the step $\Delta$op. Therefore, in order for the user to move his/her finger to the panel installation surface Sp side, it is necessary to go over the step between the panel installation surface Sp and the power supply operation portion installation surface So. Therefore, it is possible to reduce the likelihood of an erroneous operation in which the user unintentionally performs a touch operation on the operation portion of the screen of the capacitive touch panel 30a from the state where the finger is present around the power supply operation portion 30c.

Further, the transport operation portion 30d may include Braille 30d3 representing the function of the mechanical key of the transport operation portion 30d, and there may be a configuration in which a step $\Delta$op larger than a height Hd of the Braille 30d3 is present between the panel installation surface Sp and the transport operation portion installation surface Sf.

According to this configuration, the user's finger immediately after operating the forward transport operation portion 30d1 or the reverse transport operation portion 30d2 based on the Braille 30d3 is present at a position lower than the panel installation surface Sp, which is the apex in the height direction of the step $\Delta$op. Therefore, in order for the user to move his/her finger to the panel installation surface Sp side, it is necessary to go over the step between the panel installation surface Sp and the power supply operation portion installation surface So. Therefore, it is possible to reduce the likelihood of an erroneous operation in which the user unintentionally performs a touch operation on the operation portion of the screen of the capacitive touch panel 30a from the state where the finger is present around the transport operation portion 30d.

Figure 11:
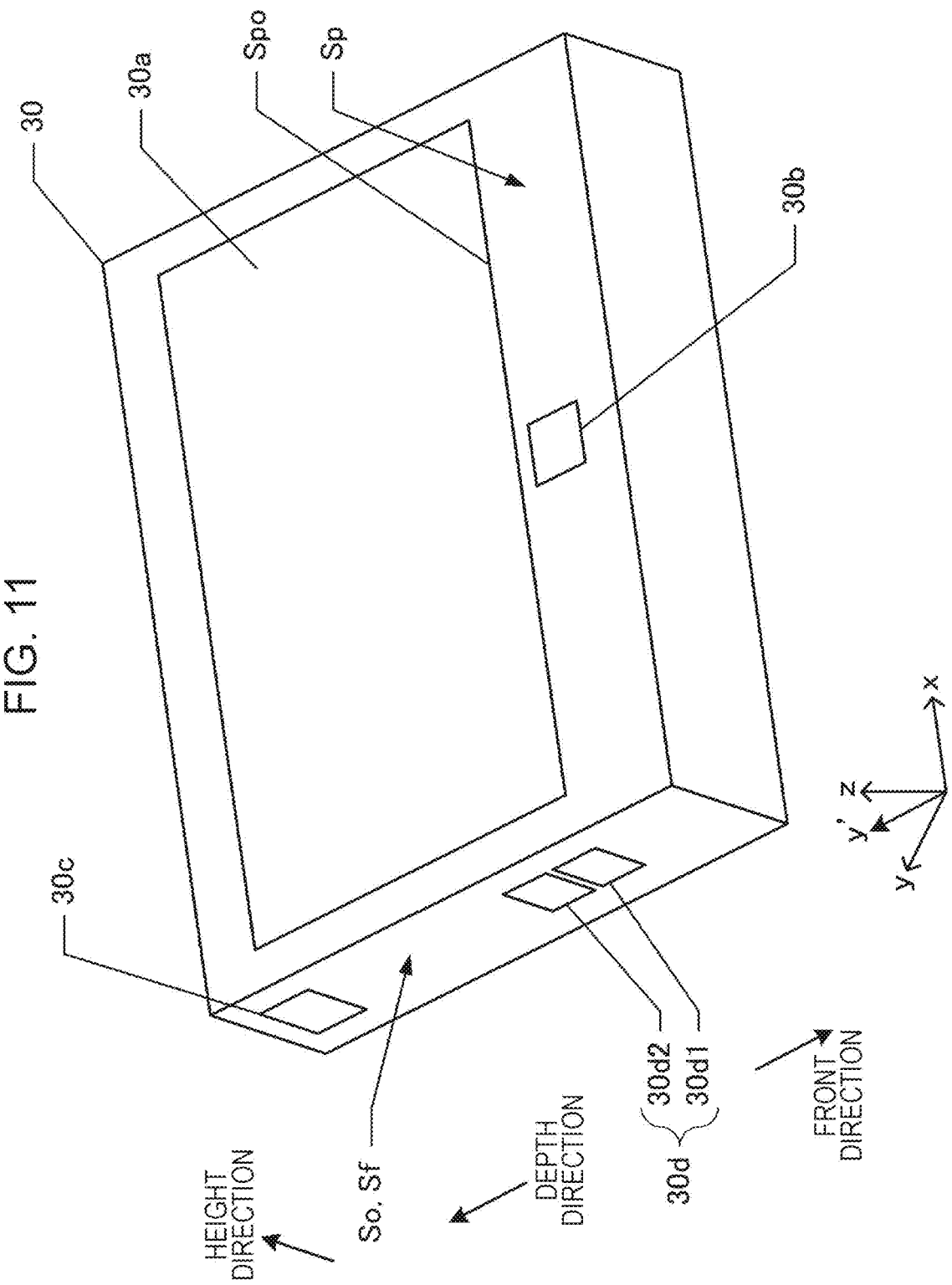
FIG. 11 is a diagram showing the appearance of the UI section.

Further, the panel installation surface Sp and the power supply operation portion installation surface So may be non-parallel. Further, the panel installation surface Sp and the transport operation portion installation surface Sf may be non-parallel. FIG. 11 is an example of a configuration in which the power supply operation portion installation surface So and the transport operation portion installation surface Sf are the same surface, and these installation surfaces are different surfaces from the panel installation surface Sp. In FIG. 11, the reference numerals of the operation portion and the like are the same as those shown in FIG. 3.

In FIG. 11, the UI section 30 has a rectangular parallelepiped outer shape, and is attached in a state where the panel installation surface Sp is inclined with respect to the surface of the housing of the printing device 1. The situation in which the panel installation surface Sp is parallel to the xy' plane is the same as that of the embodiment shown in FIG. 3. In FIG. 11, the power supply operation portion installation surface So and the transport operation portion installation surface Sf are side surfaces located on the left side in the left-right direction (x direction) when viewed from the user.

According to such a configuration, the panel installation surface Sp can be orthogonal to the power supply operation portion installation surface So and the transport operation portion installation surface Sf. Therefore, in the process of operating the operation portion (home operation portion 30b or operation portion on the capacitive touch panel 30a) on the panel installation surface Sp side, it is possible to reduce the likelihood of erroneously operating the power supply operation portion 30c and the transport operation portion 30d. Further, in the process of operating the power supply operation portion 30c and the transport operation portion 30d, it is possible to reduce the likelihood of erroneously operating the operation portion on the panel installation surface Sp side.

Figure 12:
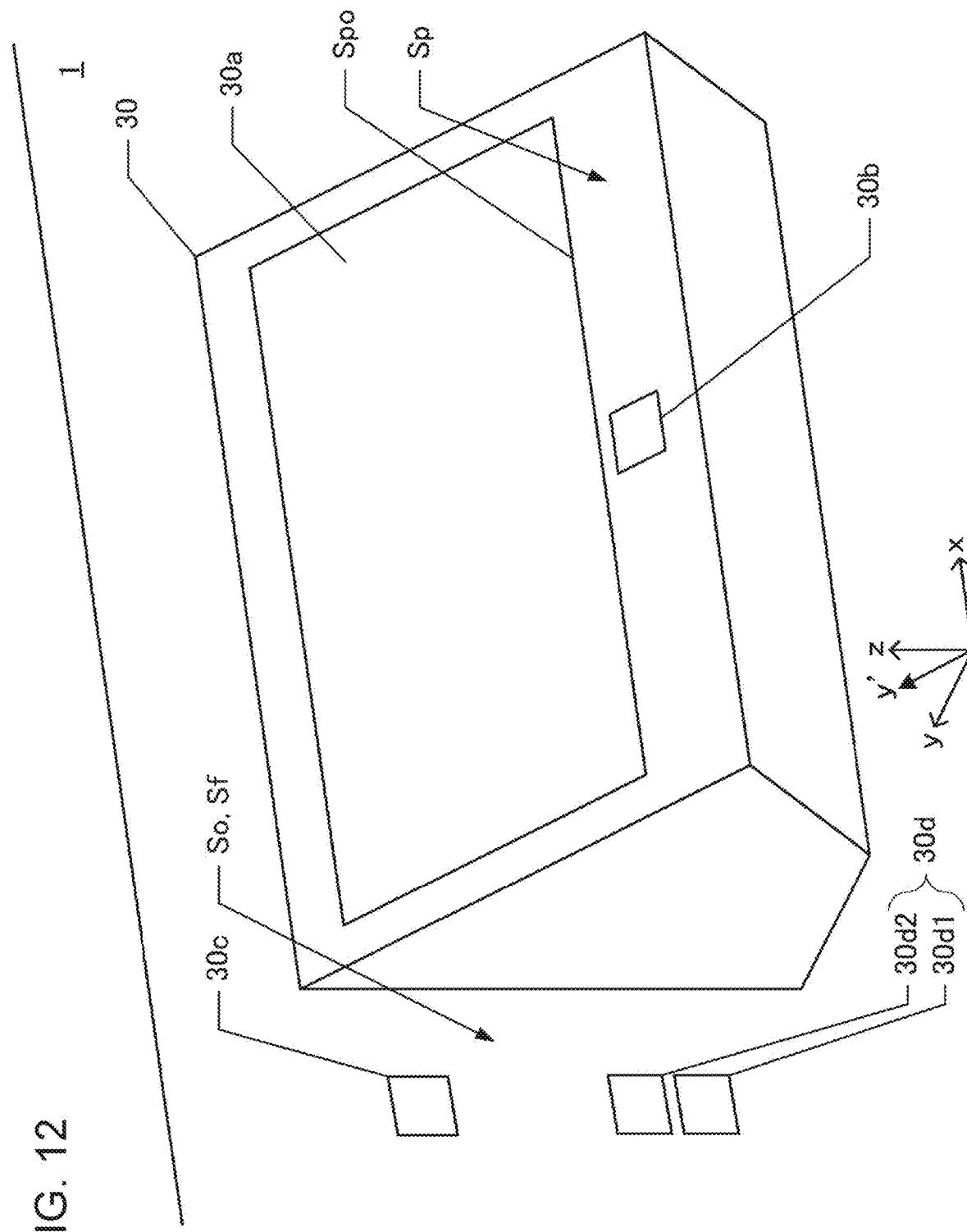
FIG. 12 is a diagram showing the appearance of the UI section.

FIG. 12 is also an example of a configuration in which the power supply operation portion installation surface So and the transport operation portion installation surface Sf are the same surface, and these installation surfaces are different surfaces from the panel installation surface Sp. Also in FIG. 12, the reference numerals of the operation portion and the like are the same as those shown in FIG. 3. In FIG. 12, the UI section 30 is composed of a polyhedron protruding from the housing of the printing device 1. Also in the example shown in FIG. 12, the panel installation surface Sp is parallel to the xy' plane shown in FIG. 3. In FIG. 12, the power supply operation portion installation surface So and the transport operation portion installation surface Sf are surfaces (xz plane) facing the user in the housing of the printing device 1. The power supply operation portion 30c and the transport operation portion 30d are formed in the vicinity of the polyhedron provided with the capacitive touch panel 30a.

According to such a configuration, the panel installation surface Sp, and the power supply operation portion installation surface So and the transport operation portion installation surface Sf are clearly different surfaces when viewed from the user. Therefore, in the process of operating the operation portion (home operation portion 30b or operation portion on the capacitive touch panel 30a) on the panel installation surface Sp side, it is possible to reduce the likelihood of erroneously operating the power supply operation portion 30c and the transport operation portion 30d. Further, in the process of operating the power supply operation portion 30c and the transport operation portion 30d, it is possible to reduce the likelihood of erroneously operating the operation portion on the panel installation surface Sp side.

It is sufficient that the printing device is any printing device that performs printing using a recording material. That is, it is sufficient that the printing device is any printing device that records the recording material on the medium by performing various inputs using a user interface such as an operation portion or an capacitive touch panel. The recording material is not limited to the ink as in the above-described embodiments, and may be toner, or various substances capable of forming an image on the medium may be used as the recording material. The printing method is also not limited, and various methods such as an electrophotographic method, a transfer method, and a sublimation type may be employed.

The capacitive touch panel is an interface capable of inputting by touching a user's finger or the like, and includes a display capable of displaying an image. The displayed image is not limited to the above-described embodiments, and may be displayed in various modes. That is, the mode is not limited, such as the disposition of soft keys, the part that functions as a soft key, and the part where information is displayed without functioning as a soft key.

In addition, the same type or the same screen may be displayed in a plurality of modes. For example, the screen displayed as the basic screen may have a different configuration depending on the settings and the like. The touch panel is preferably an electrostatic type, but may be another type. Further, the screen displayed on the touch panel may be any screen. Therefore, there may be configured so that the information on the remaining amount of the recording material is not included in the basic screen.

The home operation portion is an operation portion including a mechanical key for transitioning from the screen displayed on the capacitive touch panel to a basic screen including the information on the remaining amount of the recording material. That is, the home operation portion is a key for transitioning from the screen displayed on the capacitive touch panel. However, it is not a soft key formed by the capacitive touch panel, but a mechanical key installed at a position different from that of the capacitive touch panel.

The information on the remaining amount of the recording material is information indicating the remaining amount of the recording material that can be used in the printing device. The information indicating the remaining amount may be in various modes, and is not limited to the mode in which the remaining amount of the recording material for each color is shown by a bar graph as in the above-described embodiments. For example, the remaining amount of the recording material for each color may be expressed numerically, the information may be an average value of the remaining amount, or the remaining amount of a specific color may be typically displayed, and various modes may be employed. Examples of the specific color include a color having the minimum remaining amount, a predetermined number of colors in ascending order of remaining amount, and a color having a high frequency of use.

It is sufficient that the basic screen is a screen that includes information on the remaining amount of recording material. In a configuration in which a plurality of screens displayed on the capacitive touch panel form a hierarchical structure and the screens can be switched so as to transition from the upper hierarchy to the lower hierarchy, the basic screen is preferably the screen of the uppermost hierarchy. In addition, in a configuration in which a plurality of screens can be displayed on the capacitive touch panel, the basic screen may be a screen displayed first, for example, a screen displayed first after the power is turned on, a screen displayed first after returning from the sleep state, or the like. Of course, these configurations are examples, and the basic screen may display more detailed information and may be capable of performing detailed settings in a screen set from the basic screen, and may be a screen of a hierarchy lower than the uppermost hierarchy.

It is sufficient that the mechanical key is a device that detects an input to the key by the user according to the operation of a movable part, and the mechanical key can be realized by various modes such as a button composed of various switches such as a tact switch. It is sufficient that the home operation portion includes a mechanical key, and it may be a part including a non-mechanical key. This also applies to other operation portions. In addition, the size of a key such as a mechanical key may be specified by various methods, and may be, for example, a size of a diameter such as a diameter or a radius, an area, a size in a specific direction, or the like.

It is sufficient that the soft key is a key that is turned on and off by a phenomenon different from the operation of the movable part, not a key for which the operation of the movable part is a detection target. That is, when a specific input is received by detecting any range of the capacitive touch panel, the range functions as a key, and this is a soft key. In the soft key, any information related to the key may or may not be displayed. It is sufficient that the operation portion including a soft key includes a soft key, and it may be a part including information other than the soft key. This also applies to other operation portions.

The power supply operation portion is an operation portion including a mechanical key for shifting the power state of the printing device. That is, the printing device can operate in a plurality of power states, and the user can shift from one power state to another power state by operating the power supply operation portion. The number of power states may be two or more, and when the number of power states is two, the power states are on and off. When the number of power states is three, for example, there are three power states, on, off, and sleep. That is, the mechanical key for shifting the power state of the printing device may be a mechanical key having only a function of shifting the printing device from the on state to the sleep state, or may be a mechanical key having a function of mutually shifting the printing device between the on state and the sleep state. However, it is desirable that the mechanical key has at least a function of shifting the power state of the printing device from the on state to the state where the power consumption is lower than that of the on state.

When the home operation portion is closer to the capacitive touch panel than the power supply operation portion, it is sufficient that the operability is improved by realizing this state as compared with the case where this state is not realized. For example, since the home operation portion is closer to the capacitive touch panel than the power supply operation portion, the home operation portion is easier to move a finger to the capacitive touch panel immediately after the operation than the power supply operation portion. Therefore, the home operation portion can easily operate the capacitive touch panel immediately after the operation than the power supply operation portion. In this way, the relationship between the home operation portion, the power supply operation portion, and the capacitive touch panel may be any relationship as long as the home operation portion is closer to the capacitive touch panel than the power supply operation portion, so that it is easier to move a finger to the capacitive touch panel immediately after the operation and the operability is high.

Further, for example, since the power supply operation portion is farther from the capacitive touch panel than the home operation portion, the power supply operation portion is more difficult to move a finger to the capacitive touch panel immediately after the operation than the home operation portion. Therefore, the likelihood of an erroneous operation in which the user unintentionally touches the mechanical key after operating the capacitive touch panel is lower in the power supply operation portion than in the home operation portion. An erroneous operation on the power supply operation portion causes an unintended shift of the power state, but in many cases, when the power state shifts during normal use, printing becomes impossible, so that the adverse effect of an erroneous operation is greater than an erroneous operation on the home operation portion.

In this way, the relationship between the home operation portion, the power supply operation portion, and the capacitive touch panel may be any relationship as long as the power supply operation portion is farther from the capacitive touch panel than the home operation portion, so that it is easier to prevent the occurrence of erroneous operations that have a large influence.

As described above, the relationship between the home operation portion, the power supply operation portion, and the capacitive touch panel may be any relationship as long as the operability is improved, and whether or not the home operation portion is closer to the capacitive touch panel than the power supply operation portion may be evaluated by various indexes. That is, as in the above-described embodiments, the evaluation may be performed based on the shortest distance between each operation portion and the capacitive touch panel, or the evaluation may be performed based on another index. For example, the evaluation may be performed based on the distance between the center of gravity of each operation portion and the center of gravity of the capacitive touch panel. Further, the evaluation may be performed based on a predetermined axis, for example, an orthogonal axis for specifying coordinates on the screen of the capacitive touch panel, or a distance along a direction parallel to the front-rear direction, the left-right direction, and the like when viewed from the user. Further, for example, the evaluation may be performed based on the distance between the position of the finger when operating the mechanical key of each operation portion and the position of the finger when operating the soft key of the capacitive touch panel.

The distance between the operation portions may also be evaluated by various indexes. That is, as in the above-described embodiments, the evaluation may be performed based on the shortest distance between the operation portions, or the evaluation may be performed based on the distance between the centers of gravity of the operation portions. Further, the evaluation may be performed based on a predetermined axis, for example, an orthogonal axis for specifying coordinates on the screen of the capacitive touch panel, or a distance along a direction parallel to the front-rear direction, the left-right direction, and the like when viewed from the user. Further, for example, the evaluation may be performed based on the distance between the positions of the fingers when operating the mechanical keys of each operation portion.

The width of the operation portion may be the width in any direction. As long as it is a rectangular or substantially rectangular mechanical key, the width may be in any direction along the side thereof. If it is a mechanical key such as a polygon or a circle, the width can be a length such as a diameter passing through the center of the key or a diameter.

It is sufficient that the return operation portion is any operation portion including a soft key for transitioning from the screen displayed on the capacitive touch panel to the original screen. In the above-described embodiments, the soft key of the return operation portion is a soft key for returning to the immediately preceding screen, that is, for transitioning from the hierarchy to which the screen belongs to the upper hierarchy by only one hierarchy. However, the soft key of the return operation portion is not limited to such a soft key, and may be, for example, a soft key for giving an instruction for transitioning to a lower hierarchy, a soft key for giving an instruction for transitioning to a higher or lower hierarchy of two or more hierarchies, or a combination of these. In addition, the soft key may be a soft key for transitioning to a specific screen displayed in the past, for example, a soft key for transitioning to a basic screen.

The printing device is provided with an capacitive touch panel and an operation portion as a user interface. Since the capacitive touch panel and the operation portion are interfaces having a large size, a wider surface than the capacitive touch panel and the operation portion is required to be installed in the printing device. In this way, the surface on which the capacitive touch panel and the operation portion are attached is the installation surface. The installation surface may be a surface provided with an capacitive touch panel or an operation portion, may be a surface of a housing provided in a printing device, or may be a surface of the structure attached to the housing as in the above-described embodiments.

The installation surface may be a plane or a curved surface. Installation surfaces are distinguished from each other by whether or not they can be counted as connected parts. For example, in a polyhedron, when there are sides or ridges that form a boundary between surfaces, the parts distinguished by the boundary are different surfaces. Therefore, the planes can be distinguished from each other depending on whether or not the positions and orientations of the planes are the same. In the case of the curved surface, when it is determined that the curved surface changes smoothly and is a series of continuous surfaces, it is regarded as the same surface, but when there are boundaries such as sides and ridges, the surfaces separated by the boundaries are different surfaces. In addition, when there are adjacent surfaces separated by boundaries such as grooves, even if the surfaces are continuous, such as a case where when one surface is extended, it overlaps the other surface, the surfaces can be regarded as different surfaces when there are boundaries.

The step is formed by, for example, the position of each surface being different at the boundary between two adjacent surfaces. In this case, the distance between the surfaces in a specific direction (for example, the direction perpendicular to the surfaces) corresponds to the size of the step. It is sufficient that the stroke of the mechanical key is an index for evaluating the distance between the state where the mechanical key is not operated and the state where the movable part is moved to the maximum. This index may be, for example, an index obtained by measuring the difference between the two states, an index indicating the design difference between the two states, or various indexes.

Braille may be any information as long as it can be read by a visually impaired person or the like by touch, and an installation position, a format, and information to be shown are not limited. For example, the Braille of each operation portion may be installed around the mechanical key of each operation portion, or may be installed on the mechanical key. When a convex arrow shape is formed corresponding to the key of the transport operation portion, this is also included in Braille. In addition to Braille, the power supply operation portion installation surface So may be provided with unevenness. Even in these cases, with the configuration in which a step $\Delta op$ larger than the height of Braille or unevenness is present between the panel installation surface Sp and the power supply operation portion installation surface So, in order for the user to move his/her finger to the panel installation surface Sp side, it is desirable that it is necessary to go over the step between the panel installation surface Sp and the power supply operation portion installation surface So.

In a configuration in which the home operation portion is located in the first direction of the capacitive touch panel, the power supply operation portion is located in the second direction of the capacitive touch panel, and the first direction and the second direction are orthogonal or opposite directions, with this configuration, it is only necessary to prevent the home operation portion and the power supply operation portion from being close to each other. Thereby, it is only necessary to prevent an erroneous operation of one of the home operation portion and the power supply operation portion after the operation of the other.

Therefore, it is sufficient that the first direction and the second direction are defined so that it can be determined whether or not they are located on the same side when the capacitive touch panel is used as a reference. The definition of such a direction may be defined by various methods other than the configuration in which the first direction and the second direction are defined as the directions along the orthogonal axis parallel to the side of the rectangular screen of the capacitive touch panel as in the above-described embodiments. For example, the definition may be made based on a user's point of view. Further, with one point on the capacitive touch panel as a reference, the direction from the reference to the home operation portion may be defined as the first direction, and the direction from the reference to the power supply operation portion may be defined as the second direction.

What is claimed is:

1. A printing device that performs printing using a recording material, the printing device comprising:
   a capacitive touch panel;
   a home operation portion including a mechanical key for transitioning from a screen displayed on the capacitive touch panel to a basic screen including information on a remaining amount of the recording material; and
   a power supply operation portion including a mechanical key for shifting a power state of the printing device, wherein
   a panel installation surface provided with the capacitive touch panel is a surface different from a power supply operation portion installation surface provided with the power supply operation portion,
   the power supply operation portion includes Braille representing a function of the mechanical key of the power supply operation portion, and
   a step larger than a height of the Braille is present between the panel installation surface and the power supply operation portion installation surface.

2. The printing device according to claim 1, wherein the step between the panel installation surface and the power supply operation portion installation surface is larger than a stroke of the mechanical key of the home operation portion.

3. The printing device according to claim 1, wherein the step between the panel installation surface and the power supply operation portion installation surface is larger than a stroke of the mechanical key of the power supply operation portion.

4. The printing device according to claim 1, wherein the panel installation surface and the power supply operation portion installation surface are non-parallel.

5. The printing device according to claim 1, wherein a difference in height between a surface of the capacitive touch panel and a surface of the home operation portion in a state where the mechanical key is not operated is smaller than the step between the panel installation surface and the power supply operation portion installation surface.

6. The printing device according to claim 1, wherein
a difference in height between a surface of the capacitive touch panel and a surface of the home operation portion in a state where the mechanical key is not operated is smaller than a difference in height between the surface of the capacitive touch panel and a surface of the power supply operation portion in a state where the mechanical key is not operated.

7. The printing device according to claim 1, wherein
a surface of the power supply operation portion in a state where the mechanical key is not operated is lower than a surface of the capacitive touch panel.

8. The printing device according to claim 1, wherein
the step between the panel installation surface and the power supply operation portion installation surface is present in a central region between the capacitive touch panel and the power supply operation portion.

9. The printing device according to claim 1, wherein
the home operation portion is closer to the capacitive touch panel than the step between the panel installation surface and the power supply operation portion installation surface.

10. The printing device according to claim 1, wherein
the screen displayed on the capacitive touch panel includes a return operation portion including a soft key for transitioning from the displayed screen to an original screen, and an in-screen operation portion including a soft key other than the return operation portion, and the home operation portion and the return operation portion sandwich the in-screen operation portion.

11. The printing device according to claim 10, wherein
the power supply operation portion and the return operation portion sandwich the in-screen operation portion.

12. The printing device according to claim 10, wherein
the home operation portion and the power supply operation portion sandwich the in-screen operation portion.

13. The printing device according to claim 10, wherein
the home operation portion and the in-screen operation portion are located at the same position in a longitudinal direction of the capacitive touch panel.

14. The printing device according to claim 10, wherein
the power supply operation portion is located on a back side of the in-screen operation portion in a lateral direction of the capacitive touch panel when viewed from a user who uses the printing device.

15. The printing device according to claim 1, wherein
the home operation portion and the power supply operation portion sandwich the capacitive touch panel.

16. The printing device according to claim 1, wherein
the home operation portion and the power supply operation portion sandwich the information on the remaining amount displayed on the capacitive touch panel.

17. The printing device according to claim 1, wherein
the mechanical key of the home operation portion is smaller than the mechanical key of the power supply operation portion.

* * * * *